(12) United States Patent
Shimizu et al.

(10) Patent No.: US 10,920,007 B2
(45) Date of Patent: Feb. 16, 2021

(54) URETHANE RESIN COMPRISING A POLYROTAXANE AND POLISHING PAD

(71) Applicant: TOKUYAMA CORPORATION, Shunan (JP)

(72) Inventors: Yasutomo Shimizu, Shunan (JP); Takayoshi Kawasaki, Shunan (JP); Junji Momoda, Shunan (JP); Mitsuki Tochi, Urayasu (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 3 days.

(21) Appl. No.: 16/344,599

(22) PCT Filed: Nov. 16, 2017

(86) PCT No.: PCT/JP2017/041200
§ 371 (c)(1),
(2) Date: Apr. 24, 2019

(87) PCT Pub. No.: WO2018/092826
PCT Pub. Date: May 24, 2018

(65) Prior Publication Data
US 2019/0263961 A1    Aug. 29, 2019

(30) Foreign Application Priority Data

Nov. 17, 2016  (JP) .............................. JP2016-224330
Aug. 25, 2017  (JP) .............................. JP2017-161744

(51) Int. Cl.
| | | |
|---|---|---|
| *C08G 18/64* | (2006.01) | |
| *C08G 18/10* | (2006.01) | |
| *C08G 18/32* | (2006.01) | |
| *C08G 18/76* | (2006.01) | |
| *C08G 83/00* | (2006.01) | |
| *C08G 18/48* | (2006.01) | |

(52) U.S. Cl.
CPC .............. *C08G 18/64* (2013.01); *C08G 18/10* (2013.01); *C08G 18/3206* (2013.01); *C08G 18/3225* (2013.01); *C08G 18/48* (2013.01); *C08G 18/7614* (2013.01); *C08G 83/007* (2013.01)

(58) Field of Classification Search
None
See application file for complete search history.

(56) References Cited

U.S. PATENT DOCUMENTS

| 2006/0115255 A1* | 6/2006 | Nomura ................. G03B 17/04 396/55 |
| 2009/0030108 A1* | 1/2009 | Ito ........................... C08L 71/02 523/106 |
| 2011/0124823 A1* | 5/2011 | Hayashi ................ C08G 63/912 525/424 |
| 2011/0256393 A1* | 10/2011 | Arai ........................... C09J 7/22 428/352 |
| 2016/0222285 A1* | 8/2016 | Shimizu .................... G02B 5/23 |
| 2017/0369704 A1* | 12/2017 | Hayashi ................. C08G 18/48 |
| 2018/0030341 A1 | 2/2018 | Shimizu et al. |
| 2019/0263961 A1* | 8/2019 | Shimizu ............. C08G 18/7642 |

FOREIGN PATENT DOCUMENTS

| JP | 2007-077207 A1 | 3/2007 |
| JP | 2010-138258 A | 6/2010 |
| JP | 2011-241401 A | 12/2011 |
| JP | 2015-178558 A | 10/2015 |
| JP | 2016-153729 A | 8/2016 |
| JP | 2017-048305 A | 3/2017 |
| JP | 2017-075301 A | 4/2017 |
| WO | WO 2006/115255 A1 | 11/2006 |
| WO | WO 2010/024431 A1 | 3/2010 |
| WO | WO 2011/108515 A1 | 9/2011 |
| WO | WO 2013/099842 A1 | 7/2013 |
| WO | WO 2015/068798 A1 | 5/2015 |
| WO | WO 2015/159875 A1 | 10/2015 |
| WO | WO 2016/114243 A1 | 7/2016 |
| WO | WO 2016/143910 A1 | 9/2016 |

OTHER PUBLICATIONS

International Search Report (PCT/ISA/210) issued in PCT/JP2017/041200, dated Feb. 6, 2018.
Written Opinion of the International Searching Authority (PCT/ISA/237) issued in PCT/JP2017/041200, dated Feb. 6, 2018.
International Preliminary Report on Patentability and English translation of the Written Opinion issued in PCT/JP2017/041200, dated May 31, 2019.

\* cited by examiner

*Primary Examiner* — Peter A Salamon
(74) *Attorney, Agent, or Firm* — Birch, Stewart, Kolasch & Birch, LLP

(57) ABSTRACT

To provide a urethane resin for sliding members which has high abrasion resistance and is considered that crosslinking points are uniformly dispersed so that molecular motion is suitably possible. Particularly, to provide the urethane resin can be advantageously used as a polishing pad.

There is provided the urethane resin for polishing is obtained by polymerizing a polymerizable composition comprising (A) a polyrotaxane having a composite molecular structure formed by an axial molecule and a plurality of cyclic molecules clathrating the axial molecule and side chains having an active hydrogen group introduced into at least some of the cyclic molecules and (B) a polyiso(thio)cyanate compound.

13 Claims, 1 Drawing Sheet

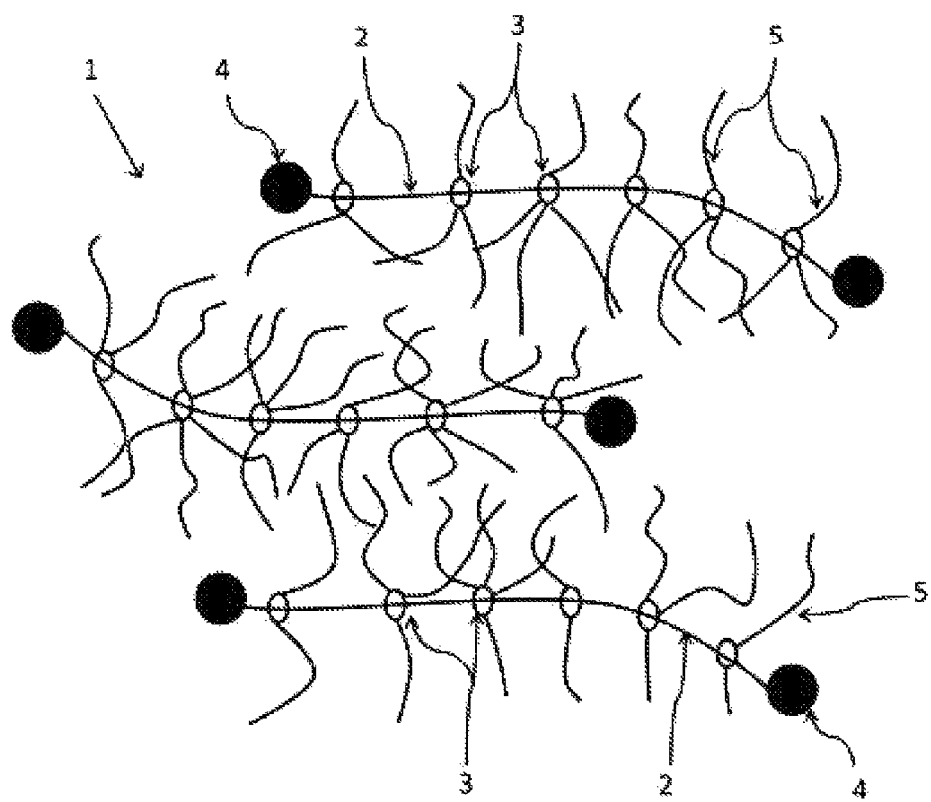

U.S. 10,920,007 B2

URETHANE RESIN COMPRISING A POLYROTAXANE AND POLISHING PAD

TECHNICAL FIELD

The present invention relates to a novel urethane resin. More specifically, it relates to a novel urethane resin obtained by polymerizing a specific polymerizable monomer component and to a novel polishing pad made of the urethane resin.

BACKGROUND ART

A polishing member is a member which is used to flatten a member to be polished with an abrasive. Stated more specifically, the polishing member is caused to slide over the surface of a member to be polished with continuous contact on the surface while an abrasive such as slurry is supplied onto the surface so as to flatten the surface of the member. For example, it includes a polishing pad.

A polyurethane resin is often used in the polishing member. In general, as the polishing member, a material having high abrasion resistance and high durability for a long time is always desired from the viewpoints of cost reduction, stable production and the improvement of productivity.

The polishing member is used as a pad material (may be referred to as "polishing pad" hereinafter) in a CMP (Chemical Mechanical Polishing) method. The CMP method is a polishing method which provides excellent surface flatness and is employed especially in production processes for liquid crystal displays (LCD), glass substrates for hard disks, silicon wafers and semiconductor devices.

In the above CMP method, in general, a slurry (polishing liquid) prepared by dispersing abrasive grains in an alkali solution or acid solution is supplied at the time of polishing. That is, an object to be polished is flattened by the mechanical function of the abrasive grains contained in the slurry and the chemical function of the alkali solution or acid solution. In general, the slurry is supplied onto the surface of the object to be polished and a polishing pad material is brought into contact with the surface while sliding over the surface to flatten the surface of the object.

As the polishing property of the polishing pad in the above CMP method, the polishing pad needs to provide excellent flatness to the object to be polished and have a high polishing rate (polishing speed). Further, the improvement of abrasion resistance is desired to improve productivity.

As the material of this polishing pad, there is known a polishing material obtained from a urethane curable composition comprising a main agent containing a urethane prepolymer obtained by reacting a polyol and a polyisocyanate such as toluene diisocyanate and a curing agent containing an amine compound (refer to Patent Document 1). Further, there is known a polishing material comprising p-phenylene diisocyanate as a polyisocyanate compound, which can further improve abrasion resistance (refer to Patent Document 2).

However, the polishing materials described in these methods have room for improvement so as to meet the recent requirement for high abrasion resistance since the polyol compound is a diol compound and there is no crosslinked structure in the obtained urethane resin.

Meanwhile, the development of a polyrotaxane as a polymer having a novel structure is now under way. This polyrotaxane is a functional material having a composite molecular structure formed by an axial molecule and a plurality of cyclic molecules clathrating the axial molecule. A specific development example thereof is a polyrotaxane which is used in an abrasion part and will become a member having excellent slidability (refer, for example, to Patent Document 3).

Although it is considered that a material containing the polyrotaxane disclosed by Patent Document 3 is aimed to be used mainly in sport goods, construction materials or medical materials, it has room for improvement so as to meet the requirement for high abrasion resistance.

The following resins comprising a polyrotaxane are now under study. For example, there is known a thermoplastic resin comprising a polyrotaxane and a thermoplastic polyurethane (refer to Patent Document 4). Since the thermoplastic resin disclosed by this Patent Document 4 comprises a polyrotaxane, the mechanical properties of the thermoplastic polyurethane resin are improved. However, the polyrotaxane and the thermoplastic polyurethane are merely mixed together and therefore, there is room for improvement to meet the requirement for high abrasion resistance.

In contrast to this, the improvement of the mechanical properties of a polyurethane is being made by introducing a polyrotaxane itself into the molecule of the polyurethane (refer to Patent Documents 5 to 7).

PRIOR ART DOCUMENTS

Patent Document

Patent Document 1: JP-A 2007-77207
Patent Document 2: JP-A 2015-178558
Patent Document 3: WO2006/115255
Patent Document 4: WO2016/114243
Patent Document 5: WO2015/159875
Patent Document 6: JP-A 2017-48305
Patent Document 7: JP-A 2017-75301

DISCLOSURE OF THE INVENTION

Problem to be Solved by the Invention

The mechanical properties of the polyurethanes disclosed by Patent Documents 5 to 7 can be improved more effectively.

However, the development of a high-performance resin has recently been desired. As a urethane resin for use in polishing pads in particular, the development of a urethane resin having higher abrasion resistance than a conventional polyurethane resin has been desired. In addition, for use in polishing pads, for example, a urethan resin which does not produce a fine flaw, that is, has high scratch resistance and a high polishing rate and can produce smooth wafers stably is desired when a semiconductor material such as a wafer is polished. Therefore, a polishing pad which has suitable hardness and excellent scratch resistance and is excellent in elastic recovery with low hysteresis to enable stable polishing at a high polishing rate in addition to excellent abrasion resistance is desired.

It is therefore an object of the present invention to provide a urethane resin which has high abrasion resistance, excellent elastic recovery and is used as a low-hysteresis sliding member. Particularly, it is an object of the present invention to provide a urethane resin which can be advantageously used as a polishing pad.

Means for Solving the Problem

The inventors of the present invention conducted intensive studies to solve the above problem and found that the above problem can be solved by using a urethane resin obtained by reacting a polyrotaxane having a specific structure, specifically modified cyclic molecules, and a polyisocyanate compound as a polishing member. The present invention was thus accomplished.

That is, according to the present invention, there is provided (1) a urethane resin which is obtained by polymerizing a polymerizable composition, which comprises (A) a polyrotaxane having a composite molecular structure comprising an axial molecule and a plurality of cyclic molecules clathrating the axial molecule, wherein side chains having a group with active hydrogen introduced into at least some of the cyclic molecules, and (B) a polyiso(thio)cyanate compound.

In the present invention, the above polyrotaxane (A) is a molecular complex having a structure that a chain axial molecule passes through the inside of each of the rings of a plurality of cyclic molecules, a bulky group is bonded to both ends of the axial molecule, and the cyclic molecules cannot be removed from the axial molecule due to steric hindrance.

The molecular complex like the polyrotaxane is called "supramolecule".

The polymerizable composition of the present invention can take the following modes.

(2) The urethane resin in the above paragraph (1), wherein the above polymerizable composition comprises 3 to 2,000 parts by mass of the above polyiso(thio)cyanate compound (B) based on 100 parts by mass of the polyrotaxane (A).

(3) The above polymerizable composition further comprises (C) an active hydrogen-containing compound having a group with active hydrogen except for the above polyrotaxane (A).

(4) The above active hydrogen-containing compound (C) contains (CA) a compound having an amino group as the group having active hydrogen.

(5) The above polymerizable composition comprises 10 to 3,000 parts by mass of the above polyiso(thio)cyanate compound (B) and 3 to 2,000 parts by mass of the above active hydrogen-containing compound (C) based on 100 parts by mass of the above polyrotaxane (A).

(6) The above polyiso(thio)cyanate compound (B) contains (B2) a urethane prepolymer having an iso(thio)cyanate group at the end of the molecule which is obtained by reacting (C1) a bifunctional active hydrogen-containing compound having two groups with active hydrogen in the molecule with (B1) a bifunctional iso(thio)cyanate group-containing compound having two iso(thio)cyanate groups in the molecule.

(7) The isocyanate equivalent of the above polyiso(thio)cyanate compound (B) containing the urethane prepolymer (B2) is 300 to 5,000.

(8) A polishing pad made of the urethane resin in any one of the above paragraphs (1) to (7).

Effect of the Invention

The urethane resin of the present invention has suitable hardness, excellent elastic recovery (low hysteresis loss) and high abrasion resistance as shown in Examples which will be given hereinafter.

Therefore, when the urethane resin is used as a sliding member (polishing material), for example, a polishing pad, it can develop not only high abrasion resistance but also excellent polishing properties, that is, high polishing rate, low scratching property and high flatness.

BRIEF DESCRIPTION OF THE DRAWINGS

FIG. 1 This is an image diagram of a polyrotaxane (A) used in the present invention.

PRACTICAL EMBODIMENT OF THE INVENTION

The urethane resin of the present invention is obtained by polymerizing a polymerizable composition comprising (A) a polyrotaxane having a composite molecular structure formed by an axial molecule and a plurality of cyclic molecules clathrating the axial molecule and side chains having a group with active hydrogen introduced into at least some of the cyclic molecules and (B) a polyiso(thio) cyanate compound.

The urethane resin of the present invention is a thermosetting urethane resin into which the above polyrotaxane (A) has been introduced into the molecule.

A description is first given of the polyrotaxane (A) (may be simply referred to as "polyrotaxane (A)" or "component (A)" hereinafter) having a composite molecular structure formed by an axial molecule and a plurality of cyclic molecules clathrating the axial molecule and side chains having a group with active hydrogen introduced into at least some of the cyclic molecules.

<(A) Polyrotaxane Having a Composite Molecular Structure Formed by an Axial Molecule and a Plurality of Cyclic Molecules Clathrating the Axial Molecule and Side Chains Having a Group with Active Hydrogen Introduced into at Least Some of the Cyclic Molecules>

The polyrotaxane (A) used in the present invention is represented by "1" as a whole and has a composite molecular structure formed by a chain axial molecule "2", cyclic molecules "3" and side chains "5" as shown in FIG. 1. That is, a plurality of the cyclic molecules "3" clathrate the chain axial molecule "2", and the axial molecule "2" passes through the inside of each of the rings of the cyclic molecules "3". Therefore, the cyclic molecules "3" can freely slide over the axial molecule "2" but a bulky terminal group "4" is formed at both ends of the axial molecule "2" to prevent the cyclic molecules "3" from falling off from the axial molecule "2". The side chains "5" having a group with active hydrogen are introduced into the rings of the cyclic molecules "3".

In the above polyrotaxane (A), the cyclic molecule "3" can slide over the axial molecule "2". In addition, the side chains having a group with active hydrogen are introduced from the cyclic molecules "3", thereby making it possible to form a crosslinked structure or a pseudo-crosslinked structure by reacting with the above active hydrogen-containing compound (C) which will be described in detail hereinafter and the polyiso(thio)cyanate compound (B). As a result, it is assumed that the abrasion resistance of the urethane resin is improved since the urethane resin has crosslinking points which facilitate molecular motion. Further, it is considered that the urethane resin has a low hysteresis loss and can develop excellent mechanical properties since it has the above slidable crosslinked structure in the molecule.

The above polyrotaxane (A) can be synthesized by a method described in WO2015/068798. The constitution of the above component (A) will be described hereinunder.

(Axial Molecule of Polyrotaxane (A))

In the above polyrotaxane (A), various axial molecules are known. For example, the chain part may be linear or branched as long as it can pass through the rings of the cyclic molecules and is generally formed from a polymer. It is described in WO2015/068798.

Preferred examples of the polymer forming this chain part of the axial molecule include polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether, out of which polyethylene glycol is particularly preferred.

Further, the bulky group formed at the both ends of the chain part is not particularly limited if it prevents the cyclic molecules from falling off from the axial molecule but preferably adamantyl group, trityl group, fluoresceinyl group, dinitrophenyl group or pyrenyl group from the viewpoint of bulk. Out of these, adamantyl group is particularly preferred from the viewpoint of introduction ease.

Although the molecular weight of the above axial molecule is not particularly limited, when it is too high, viscosity tends to become high and when it is too low, the mobility of the cyclic molecules tends to become low. From this point of view, the weight average molecular weight Mw of the axial molecule is preferably 1,000 to 100,000, more preferably 5,000 to 80,000, particularly preferably 10,000 to 50,000.

(Cyclic Molecules of Polyrotaxane (A))

Each of the cyclic molecules has a ring large enough to clathrate the above axial molecule. Examples of this ring include cyclodextrin ring, crown ether ring, benzo-crown ring, dibenzo-crown ring and dicyclohexano-crown ring, out of which cyclodextrin ring is particularly preferred.

The cyclodextrin ring has α-form (ring inner diameter of 0.45 to 0.6 nm), β-form (ring inner diameter of 0.6 to 0.8 nm) or γ-form (ring inner diameter of 0.8 to 0.95 nm). Out of these, α-cyclodextrin ring is most preferred.

A plurality of the cyclic molecules having the above ring clathrate one axial molecule. In general, when the maximum number of cyclic molecules capable of clathrating one axial molecule is 1, the number of clathrating cyclic molecules is preferably 0.001 to 0.6, more preferably 0.002 to 0.5, much more preferably 0.003 to 0.4.

The maximum number of cyclic molecules clathrating one axial molecule can be calculated from the length of the axial molecule and the thickness of each of the rings of the cyclic molecules. For example, when the chain part of the axial molecule is formed from polyethylene glycol and the ring of the cyclic molecule is an α-cyclodextrin ring, the maximum number of clathrating cyclic molecules is calculated as follows.

That is, two recurring units [—$CH_2$—$CH_2$O-] of polyethylene glycol approximate the thickness of one α-cyclodextrin ring. Therefore, the number of the recurring units is calculated from the molecular weight of the polyethylene glycol to obtain ½ of the number of the recurring units as the maximum number of clathrating cyclic molecules. Based on the condition that the maximum number of clathrating cyclic molecules is 1.0, the number of clathrating cyclic molecules is adjusted to the above range.

(Side Chains of Cyclic Molecules of Polyrotaxane (A))

The polyrotaxane (A) used in the present invention is characterized in that side chains are introduced into the cyclic molecules and have a group with active hydrogen. In the present invention, the side chains of the above cyclic molecules have a certain length. The active hydrogen that the cyclic molecules have directly does not correspond to the active hydrogen of the side chain. That is, for example, when the cyclic molecule is an α-cyclodextrin ring, the active hydrogen of a hydroxyl group (OH group) that the α-cyclodextrin ring has does not correspond to the active hydrogen of the side chain. In the present invention, it is considered that when side chains having a certain length have active hydrogen, an excellent effect is obtained. As will be described hereinafter, for example, when the cyclic molecule is an α-cyclodextrin ring in the present invention, it is preferred that a hydroxyl group (OH group) that the α-cyclodextrin ring has should be reacted with another compound to form a ring having side chains from the compound, thereby introducing active hydrogen into the side chains.

The group having active hydrogen that the side chain has is at least one group selected from hydroxyl group (OH group), thiol group (SH group) and amino group (—$NH_2$, or —NHR; R is a substituent such as alkyl group). Out of these, the OH group is preferred from the viewpoint of high reactivity with the iso(thio)cyanate compound (B).

Although the side chain having a group with active hydrogen is not particularly limited, it is preferably formed from repetitions of an organic chain having 3 to 20 carbon atoms. The average molecular weight of the side chain is 50 to 10,000, preferably 100 to 8,000, more preferably 200 to 5,000, most preferably 300 to 1,500. The average molecular weight of the side chain can be adjusted by the amount of the compound for introducing the side chain having a group with active hydrogen used at the time of introducing the side chain and can be obtained by calculation and also by $^1$H-NMR measurement. When the side chain is too short, the uniform flattening accuracy of the surface of the object to be polished tends to deteriorate. When the side chain is too long, abrasion resistance tends to lower.

The above side chain is introduced by making use of the functional groups of the cyclic molecule and modifying the functional groups. For example, the α-cyclodextrin ring has 18 OH groups (hydroxyl groups) as the functional groups through which the side chain is introduced. That is, a maximum of 18 side chains can be introduced into one α-cyclodextrin ring. In the present invention, to fully develop the function of the above-described side chain, not less than 6%, particularly not less than 30% of the total of all the functional groups of the ring are preferably modified by the side chain. The functional groups of the cyclic molecule may affect compatibility with another component. Especially when the functional group is an OH group, it has a large effect on compatibility with another component. Therefore, the modification ratio (modification degree) of the functional groups is preferably 6 to 80%, more preferably 30 to 70%. As will be described in detail hereinafter, since the functional groups of the cyclic molecule have lower reactivity than the OH group of the side chain, the deterioration of compatibility and a bleed-out problem hardly occur even when the modification degree is low. Therefore, when the modification degree falls within the above range, a more excellent effect is obtained. When the side chain is bonded to 9 out of the 18 hydroxyl groups of the above α-cyclodextrin ring, the modification degree is 50%.

If the above side chain (organic chain) has the group with active hydrogen, it may be linear or branched. A desired side chain can be introduced by reacting the organic chain (side chain) having a group with active hydrogen with the functional groups of the above cyclic molecule by making use of living radical polymerization such as ring-opening polymerization, radical polymerization, cationic polymerization, anionic polymerization, atom transfer radical polymerization, RAFT polymerization or NMP polymerization.

For example, a side chain derived from a cyclic compound such as lactone or cyclic ether can be introduced by ring-opening polymerization. An OH group is introduced as the group having active hydrogen into the end of a side chain which is introduced by the ring-opening polymerization of a cyclic compound such as lactone or cyclic ether.

Out of the cyclic compounds, a cyclic ether or lactone is preferably used from the viewpoints of acquisition ease, high reactivity and easy control of size (molecular weight). Preferred examples of the cyclic compound are given below.
Cyclic Ethers;
ethylene oxide, 1,2-propylene oxide, epichlorohydrin, epibromohydrin, 1,2-butylene oxide, 2,3-butylene oxide, isobutylene oxide, oxetane, 3-methyloxetane, 3,3-dimethyloxetane, tetrahydrofuran, 2-methyl tetrahydrofuran and 3-methyl tetrahydrofuran
Lactones;
4-membered cyclic lactones such as β-propiolactone, β-methyl propiolactone and L-serine-β-lactone 5-membered cyclic lactones such as γ-butyrolactone, γ-hexanolactone, γ-heptanolactone, γ-octanolactone, γ-decanolactone, γ-dodecanolactone, α-hexyl-γ-butyrolactone, α-heptyl-γ-butyrolactone, α-hydroxy-γ-butyrolactone, γ-methyl-γ-decanolactone, α-methylene-γ-butyrolactone, α,α-dimethyl-γ-butyrolactone, D-erythronolactone, α-methyl-γ-butyrolactone, γ-nonanolactone, DL-pantolactone, γ-phenyl-γ-butyrolactone, γ-undecanolactone, γ-valerolactone, 2,2-pentamethylene-1,3-dioxolan-4-one, α-bromo-γ-butyrolactone, γ-crotonolactone, α-methylene-γ-butyrolactone, α-methacryloyloxy-γ-butyrolactone and β-methacryloyloxy-γ-butyrolactone 6-membered cyclic lactones such as δ-valerolactone, δ-hexanolactone, δ-octanolactone, δ-nonanolactone, δ-decanolactone, δ-undecanolactone, δ-dodecanolactone, δ-tridecanolactone, δ-tetradecanolactone, DL-mevalonolactone, δ-lactone 4-hydroxy-1-cyclohexane carboxylate, monomethyl-δ-valerolactone, monoethyl-δ-valerolactone, monohexyl-δ-valerolactone, 1,4-dioxan-2-one and 1,5-dioxepan-2-one 7-membered cyclic lactones such as non-alkyl-ε-caprolactone, dialkyl-ε-caprolactone, monomethyl-ε-caprolactone, monoethyl-ε-caprolactone, monohexyl-ε-caprolactone, dimethyl-ε-caprolactone, di-n-propyl-ε-caprolactone, di-n-hexyl-ε-caprolactone, trimethyl-ε-caprolactone, triethyl-ε-caprolactone, tri-n-ε-caprolactone, ε-caprolactone, 5-nonyl-oxepan-2-one, 4,4,6-trimethyl-oxepan-2-one, 4,6,6-trimethyl-oxepan-2-one and 5-hydroxymethyl-oxepan-2-one 8-membered cyclic lactones such as ξ-enantholactone other lactones such as lactone, lactide, dilactide, tetramethyl glycoside, 1,5-dioxepan-2-one and t-butyl caprolactone The above cyclic compounds may be used alone or in combination of two or more.

In the present invention, the side chain introducing compound which is preferably used in the present invention is a lactone compound, lactone compounds such as ε-caprolactone, α-acetyl-γ-butyrolactone, α-methyl-γ-butyrolactone, γ-valerolactone and γ-butyrolactone are particularly preferred, and ε-caprolactone is most preferred.

When the side chain is to be introduced by reacting the cyclic compound through ring-opening polymerization, functional groups (for example, hydroxyl groups) bonded to the ring have poor reactivity and therefore, it may be difficult to directly react a large molecule due to steric hindrance. In this case, to react, for example, caprolactone, there can be employed means for introducing a large side chain through the ring-opening polymerization of the caprolactone with the hydroxyl group of a hydroxypropyl group after a low molecular weight compound such as propylene oxide is reacted with a functional group to carry out hydroxypropylation so as to introduce a highly reactive functional group (hydroxyl group). In this case, the hydroxypropylated part can be considered as the side chain.

To introduce a side chain having an OH group (hydroxyl group) into the cyclic molecules of the polyrotaxane (A) used in the present invention, when the introduction ease of the side chain, the easy control of the size (molecular weight) of the side chain and the modification of the OH group are taken into consideration, a method for introducing the side chain by ring-opening polymerization is preferably employed. Therefore, it is preferred that a side chain having an OH group at the end should be introduced.

By introducing a side chain derived from a cyclic compound such as cyclic acetal, cyclic amine, cyclic carbonate, cyclic iminoether or cyclic thiocarbonate by ring-opening polymerization, a side chain having an active hydrogen group can be introduced. Preferred examples of the cyclic compound described in WO2015/068798 may be used.

The method of introducing the side chain into the cyclic molecules by using radical polymerization is described below.

Each of the rings of the cyclic molecules of the polyrotaxane does not have an active site as a radical starting point. Therefore, prior to the reaction of a radically polymerizable compound, a compound for forming the radical starting point must be reacted with a functional group (OH group) of the ring to form the active site as the radical starting point.

A typical example of the compound for forming the radical starting point is an organic halogen compound exemplified by 2-bromoisobutyryl bromide, 2-bromobutyric acid, 2-bromopropionic acid, 2-chloropropionic acid, 2-bromoisobutyric acid, epichlorohydrin, epibromohydrin and 2-chloroethyl isocyanate. That is, the organic halogen compound is bonded to the ring by a condensation reaction with a functional group of the ring of the cyclic molecule, thereby introducing a group containing a halogen atom (an organic halogen compound residue) into the ring. A radical is produced in this organic halogen compound residue by the movement of a halogen atom upon radical polymerization to become a radical polymerization starting point from which radical polymerization proceeds.

The group (organic halogen compound residue) having an active site as the above radical polymerization starting point can also be introduced by reacting a hydroxyl group of the ring with a compound having a functional group such as amine, carboxylic acid, isocyanate, imidazole or acid anhydride to introduce a functional group other than the hydroxyl group and reacting the functional group with the above-described organic halogen compound.

As the radically polymerizable compound used to introduce the side chain by radical polymerization, a compound having at least one group having an ethylenically unsaturated bond, for example, a functional group such as (meth)acrylic group, vinyl group or styryl group (to be referred to as "ethylenically unsaturated monomer" hereinafter) is preferably used. As the ethylenically unsaturated monomer, an oligomer or polymer having a terminal ethylenically unsaturated bond (to be referred to as "macromonomer" hereinafter) may also be used. As the ethylenically unsaturated monomer, preferred cyclic compounds disclosed by WO2015/068798 may be used.

When the side chain is introduced into the cyclic molecule by using the radically polymerizable compound and the radically polymerizable compound has an active hydrogen group, the side chain has a group with active hydrogen as it is. When the radically polymerizable compound does not have a group with active hydrogen, after the side chain is formed by the radically polymerizable compound, part of the side chain should be substituted by a group having active hydrogen.

(Preferred Constitution of Polyrotaxane (A))

The polyrotaxane (A) which is most preferably used in the present invention is such that it includes polyethylene glycol bonded to an adamantyl group at both ends as the axial molecule and cyclic molecules having a α-dextrin ring as the cyclic molecules and the side chains (having a terminal OH group) are introduced into the rings by polycaprolactone. After the hydroxypropylation of the OH groups of the α-cyclodextrin ring, polycaprolactone may be introduced by ring-opening polymerization.

A description is subsequently given of the polyiso(thio) cyanate compound (B).

<(B) Polyiso(Thio)Cyanate Compound>

The polyiso(thio)cyanate compound (B) of the present invention (may be simply referred to as "component (B)" hereinafter) is a compound having at least two isocyanate groups in one molecule, at least two isothiocyanate groups in one molecule and a total number of the isocyanate groups and the isothiocyanate groups of at least two in one molecule.

The above polyiso(thio)cyanate compound (B) may contain a urethane prepolymer (B2) which is prepared by reacting a polyiso(thio)cyanate compound with the following poly(thi)ol compound. As the urethane prepolymer (B2) corresponding to the polyiso(thio)cyanate compound (B), a urethane prepolymer which contains an unreacted isocyanate group and is generally used may be used in the present invention without restriction.

The above polyiso(thio)cyanate compounds (B) are roughly classified into aliphatic isocyanates, alicyclic isocyanates, aromatic isocyanates, isothiocyanate compounds and urethane prepolymers (B2). In the present invention, the above polyiso(thio)cyanate compounds (B) may be used alone or in combination of two or more. When a plurality of the compounds are used, the basic mass amount of the component (B) is the total amount of these compounds. Examples of these polyiso(thio)cyanate compounds (B) include the following compounds.

Aliphatic Isocyanates;

Bifunctional isocyanate compounds (corresponding to a bifunctional iso(thio)cyanate group-containing compound (B1) constituting the urethane prepolymer (B2) which will be described in detail hereinafter) such as ethylene diisocyanate, trimethylene diisocyanate, tetramethylene diisocyanate, hexamethylene diisocyanate, octamethylene diisocyanate, nanomethylene diisocyanate, 2,2'-dimethylpentane diisocyanate, 2,2,4-trimethylhexamethylene diisocyanate, decamethylene diisocyanate, butene diisocyanate, 1,3-butadiene-1,4-diisocyanate, 2,4,4-trimethylhexamethylene diisocyanate, 1,6,11-trimethylundecamethylene diisocyanate, 1,3,6-trimethylhexamethylene diisocyanate, 1,8-diisocyanato-4-isocyanatomethyl octane, 2,5,7-trimethyl-1,8-diisocyanato-5-isocyanatomethyl octane, bis(isocyanatoethyl) carbonate, bis(isocyanatoethyl)ether, 1,4-butylene glycol dipropyl ether-ω,ω'-diisocyanate, lysine diisocyanatomethyl ester and 2,4,4-trimethylhexamethylene diisocyanate, and polyfunctional isocyanate compounds such as lysine triisocyanate, 2-isocyanatoethyl-2,6-diisocyanato hexanoate and 2-isocyanatopropyl-2,6-diisocyanato hexanoate Alicyclic isocyanates; Bifunctional isocyanate compounds (corresponding to the bifunctional iso(thio)cyanate group-containing compound (B1) constituting the urethane prepolymer (B2) which will be described in detail hereinafter) such as isophorone diisocyanate, (bicyclo[2.2.1]heptane-2,5-diyl)bismethylene diisocyanate, (bicyclo[2.2.1] heptane-2,6-diyl)bismethylene diisocyanate, 2β,5α-bis (isocyanato)norbornane, 2β,5β-bis(isocyanato)norbornane, 2β,6α-bis(isocyanato)norbornane, 2β,6β-bis(isocyanato) norbornane, 2,6-di(isocyanatomethyl)furan, bis(isocyanatomethyl)cyclohexane, dicyclohexylmethane-4,4'-diisocyanate, 4,4-isopropylidenebis(cyclohexyl isocyanate), cyclohexane diisocyanate, methylcyclohexane diisocyanate, dicyclohexyl dimethylmethane diisocyanate, 2,2'-dimethyl dicyclohexylmethane diisocyanate, bis(4-isocyanato-n-butylidene)pentaerythritol, dimeric acid diisocyanate, 2,5-bis(isocyanatomethyl)-bicyclo[2.2.1]-heptane, 2,6-bis(isocyanatomethyl)-bicyclo[2.2.1]-heptane, 3,8-bis (isocyanatomethyl)tricyclodecane, 3,9-bis (isocyanatomethyl)tricyclodecane, 4,8-bis (isocyanatomethyl)tricyclodecane, 4,9-bis (isocyanatomethyl)tricyclodecane, 1,5-diisocyanato decalin, 2,7-diisocyanto decalin, 1,4-diisocyanato decalin, 2,6-diisocyanato decalin, bicyclo[4.3.0]nonane-3,7-diisocyanate, bicyclo[4.3.0]nonane-4,8-diisocyanate, bicyclo[2.2.1]heptane-2,5-diisocyanate, bicyclo[2.2.1]heptane-2,6-diisocyanate, bicyclo[2,2,2]octane-2,5-diisocyanate, bicyclo[2,2,2] octane-2,6-diisocyanate, tricyclo[5.2.1.0$^{2.6}$]decane-3,8-diisocyanate and tricyclo[5.2.1.0$^{2.6}$]decane-4,9-diisocyanate, and polyfunctional isocyanate compounds such as 2-isocyanatomethyl-3-(3-isocyanatopropyl)-5-isocyanatomethyl-bicyclo[2,2,1]-heptane, 2-isocyanatomethyl-3-(3-isocyanatopropyl)-6-isocyanatomethyl-bicyclo[2,2,1]-heptane, 2-isocyanatomethyl-2-(3-isocyanatopropyl)-5-isocyanatomethyl-bicyclo[2,2,1]-heptane, 2-isocyanatomethyl-2-(3-isocyanatopropyl)-6-isocyanatomethyl-bicyclo[2,2,1]-heptane, 2-isocyanatomethyl-3-(3-isocyanatopropyl)-5-(2-isocyanatoethyl)-bicyclo[2,2,1]-heptane, 2-isocyanatomethyl-3-(3-isocyanatopropyl)-6-(2-isocyanatoethyl)-bicyclo[2,1,1]-heptane, 2-isocyanatomethyl-2-(3-isocyanatopropyl)-5-(2-isocyanatoethyl)-bicyclo[2,2,1]-heptane, 2-isocyanatomethyl-2-(3-isocyanatopropyl)-6-(2-isocyanatoethyl)-bicyclo[2,2,1]-heptane and 1,3,5-tris(isocyanatomethyl)cyclohexane Aromatic Isocyanates;

Bifunctional isocyanate compounds (corresponding to the bifunctional iso(thio)cyanate group-containing compound (B1) constituting the urethane polymer (B2) which will be described in detail hereinafter) such as xylylene diisocyanate (o-, m-, p-), tetrachloro-m-xylylene diisocyanate, methylene diphenyl-4,4'-diisocyanate, 4-chloro-m-xylylene diisocyanate, 4,5-dichloro-m-xylylene diisocyanate, 2,3,5,6-tetrabromo-p-xylylene diisocyanate, 4-methyl-m-xylylene diisocyanate, 4-ethyl-m-xylylene diisocyanate, bis (isocyanatoethyl)benzene, bis(isocyanatopropyl)benzene, 1,3-bis(α,α-dimethylisocyanatomethyl)benzene, 1,4-bis(α, α-dimethylisocyanatomethyl)benzene, α,α,α',α'-tetramethylxylylene diisocyanate, bis(isocyanatobutyl)benzene, bis (isocyanatomethyl)naphthalene, bis(isocyanatomethyl) diphenyl ether, bis(isocyanatoethyl)phthalate, 2,6-di (isocyanatomethyl)furan, phenylene diisocyanate (o-, m-, p-), tolylene diisocyanate, ethyl phenylene diisocyanate, isopropyl phenylene diisocyanate, dimethyl phenylene diisocyanate, diethyl phenylene diisocyanate, diisopropyl phenylene diisocyanate, trimethylbenzene triisocyanate, benzene triisocyanate, 1,3,5-triisocyanatomethyl benzene, 1,5-naphthalene diisocyanate, methyl naphthalene diisocyanate, biphenyl diisocyanate, 2,4-tolylene diisocyanate, 2,6-tolylene diisocyanate, 4,4'-diphenylmethane diisocyanate, 2,2'-diphenylmethane diisocyanate, 2,4'-diphenylmethane diisocyanate, 3,3'-dimethyldiphenylmethane-4,4'-diisocyanate, bibenzyl-4,4'-diisocyanate, bis(isocyanatophenyl)ethylene, 3,3'-dimethoxybiphenyl-4,4'-diisocyanate, phenyl isocyanatomethyl isocyanate, phenyl isocyanatoethyl isocyanate, tetrahydronaphthylene diisocyanate, hexahydrobenzene diisocyanate, hexahydrodiphenylmethane-4,4'-diisocyanate, diphenyl ether diisocyanate, ethylene glycol diphenyl ether diisocyanate, 1,3-propylene glycol diphenyl ether diisocyanate, benzophenone diisocyanate, diethylene glycol diphenyl ether diisocyanate, dibenzofuran diisocyanate, carbazole diisocyanate, ethyl carbazole diisocyanate, dichlorocarbazole diisocyanate 2,4-tolylene diisocyanate and 2,6-tolylene diisocyanate, and polyfunctional isocyanate compounds such as mesitylene triisocyanate, triphenylmethane triisocyanate, polymeric MDI, naphthalene triisocyanate, diphenylmethane-2,4,4'-triisocyanate, 3-methyldiphenylmethane-4,4',6-triisocyanate and 4-methyl-diphenylmethane-2,3,4',5,6-pentaisocyanate Isothiocyanate Compounds;

Bifunctional iso(thio)cyanate group-containing compounds (corresponding to the bifunctional iso(thio)cyanate group-containing compound (B1) constituting the urethane prepolymer (B2) which will be described in detail hereinafter) such as p-phenylene diisothiocyanate, xylylene-1,4-diisothiocyanate and ethylidene diisothiocyanate <Preferred Polyiso(Thio)Cyanate Compound (B)>

Out of the above polyiso(thio)cyanate compounds (B), the following compounds are preferred.

Preferred examples of the polyiso(thio)cyanate compound (B) include compounds represented by the following formulas (1) to (7) and 1,5-naphthalene diisocyanate. Further, 1,5-naphthalene diisocyanate and urethane prepolymers (B2) containing an isocyanate and a polyol and represented by the following formulas (1) to (7) may also be preferably used. Preferred modified iso(thio)cyanate compounds which are commercially available include carbodiimide modified MDI's (for example, Millionate MTL series of Tosoh Corporation) and polyol modified isocyanates (for example, Coronate 1108, Coronate 1120, Coronate 1334, Coronate 1050 and Coronate 1057 of Tosoh Corporation). These compounds may be used alone or in combination of two or more.

(Compound Having an Alkylene Chain)

A compound represented by the following formula (1) is preferably used.

[formula 1]

OCN-A-NCO (1)

(wherein "A" is an alkylene group having 1 to 10 carbon atoms, and a carbon atom in the chain of the alkylene group may be substituted by a sulfur atom). The compound represented by the above formula (1) corresponds to the bifunctional iso(thio)cyanate group-containing compound (B1) constituting the urethane prepolymer (B2) which will be described in detail hereinafter.

"A" is an alkylene group having 1 to 10 carbon atoms and may be linear or branched. It is preferably a linear group such as pentamethylene group, hexamethylene group, heptamethylene group or octamethylene group having 5 to 10 carbon atoms, or a branched group having a methyl group substituted for some of the hydrogen atoms of the pentamethylene group, hexamethylene group, heptamethylene group or octamethylene group.

Examples of the compound represented by the above formula (1) include ethylene diisocynate, pentamethylene diisocyanate, hexamethylene diisocyanate, heptamethylene diisocyanate, octamethylene diisocyanate and 2,4,4-trimethylhexanemethylene diisocyanate. These compounds may be used alone or in combination of two or more.

(Compound Having One Phenyl Group or Cyclohexane Group (Ring) in Molecule)

A compound represented by the following formula (2) or (3) is preferably used.

[formula 2]

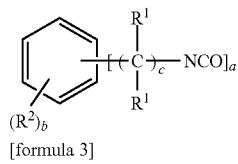

[formula 3]

$$\text{(R}^2\text{)}_b \begin{array}{c} R^1 \\ | \\ -[-C-]_c-NCO]_a \\ | \\ R^1 \end{array} \quad (3)$$

(wherein two $R^1$'s in the above formulas (2) and (3) are each an alkyl group having 1 to 4 carbon atoms or hydrogen atom and may be the same or different, $R^2$ is an alkyl group having 1 to 4 carbon atoms and may be the same or different when a plurality of $R^2$'s are existent, "a" is an integer of 2 or 3, "b" is an integer of 0 to 4, and "c" is an integer of 0 to 4.) As for the difference between the compound represented by the formula (2) and the compound represented by the above formula (3), the former (compound represented by the above formula (2)) is a compound having a phenyl group and the latter (compound represented by the formula (3)) is a compound having a cyclohexane group (ring). When "a" is 2 (two isocyanate groups) in the compound represented by the above formula (2) or (3), the compound corresponds to the bifunctional iso(thio)cyanate group-containing compound (B1) constituting the urethane prepolymer (B2) which will be described in detail hereinafter.

The alkyl group having 1 to 4 carbon atoms represented by $R^1$ may be linear or branched. $R^1$ is particularly preferably a hydrogen atom, methyl group or ethyl group.

The alkyl group having 1 to 4 carbon atoms represented by $R^2$ may be linear or branched. $R^2$ is particularly preferably a hydrogen atom, methyl group or ethyl group.

Examples of the compound represented by the above formula (2) or (3) include isophorone diisocyanate, xylene diisocyanate (o-, m-, p-), 2,4-tolylene diisocyanate, 2,6-tolylene diisocyanate and phenylene diisocyanate (o-, m-, p-). These compounds may be used alone or in combination of two or more.

(Compound Having Two Phenyl Groups or Two Cyclohexane Groups (Rings) in Molecule)

A compound represented by the following formula (4) or (5) is preferably used.

[formula 4]

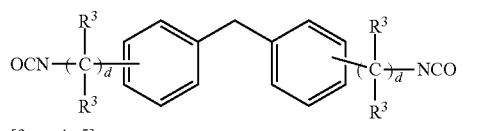

[formula 5]

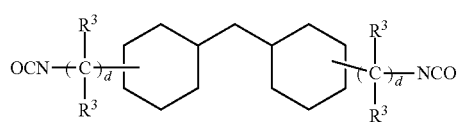

(wherein four $R^3$'s in the formulas (4) and (5) are each an alkyl group having 1 to 4 carbon atoms or hydrogen atom and may be the same or different, and "d" is an integer of 0 to 4.) As for the difference between the compound represented by the above formula (4) and the compound represented by the above formula (5), the former (compound represented by the above formula (4)) is a compound having two phenyl groups and the latter (compound represented by the above formula (5)) is a compound having two cyclohexane groups (rings). The compound represented by the above formula (4) or (5) corresponds to the bifunctional iso(thio)cyanate group-containing compound (B1) constituting the urethane prepolymer (B2) which will be described in detail hereinafter.

The alkyl group having 1 to 4 carbon atoms represented by $R^3$ may be linear or branched. $R^3$ is particularly preferably a hydrogen atom, methyl group or ethyl group.

Examples of the compound represented by the above formula (4) or (5) include 2,2'-diphenylmethane diisocyanate, 2,4'-diphenylmethane diisocyanate, 4,4'-diphenylmethane diisocyanate and dicyclohexylmethane-4,4'-diisocyanate. These compounds may be used alone or in combination of two or more.

(Compound Having a Norbornane Ring)

This compound is represented by the following formula

[formula 6]

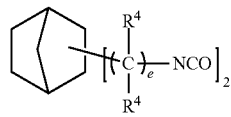

(wherein $R^4$'s are each an alkyl group having 1 to 4 carbon atoms or hydrogen atom and may be the same or different, and "e" is an integer of 0 to 4.) The compound represented by the above formula (6) corresponds to the bifunctional iso(thio)cyanate group-containing compound (B1) constituting the urethane prepolymer (B2) which will be described in detail hereinafter.

The alkyl group having 1 to 4 carbon atoms represented by $R^4$ may be linear or branched. $R^4$ is particularly preferably a hydrogen atom, methyl group or ethyl group.

Examples of the compound represented by the above formula (6) include norbornane diisocyanate, 2,5-bis(isocyanatomethyl)-bicyclo[2,2,1]-heptane and 2,6-bis(isocyanatomethyl)-bicyclo[2,2,1]-heptane. These compounds may be used alone or in combination of two or more.

(Polymeric Compound)

This compound is represented by the following formula (7).

[formula 7]

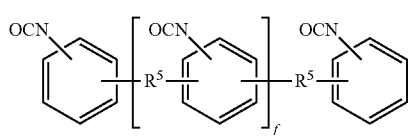

(wherein two $R^5$'s are each an alkyl group having 1 to 4 carbon atoms and may be the same or different, and "f" is an integer of 1 to 100.)

The alkyl group having 1 to 4 carbon atoms represented by $R^5$ may be linear or branched. $R^5$ is particularly preferably a methyl group or ethyl group.

Examples of the compound represented by the above formula (7) include polymeric MDI's, for example, Millionate MR series of Tosoh Corporation. These compounds may be used alone or in combination of two or more.

(Particularly Preferred Polyiso(Thio)Cyanate Compound (B))

Out of the above preferred iso(thio)cyanates, more preferred iso(thio)cyanate compounds are aromatic isocyanates and modified products thereof (urethane prepolymers (B2)). Out of these, urethane prepolymers (B2) are particularly preferably used.

(Particularly Preferred Polyiso(Thio)Cyanate Compound (B): Urethane Prepolymer (B2))

In the present invention, a urethane prepolymer (B2) having an iso(thio)cyanate group at the end of the molecule which is obtained by reacting a bifunctional active hydrogen-containing compound (C1) having two groups with active hydrogen in the molecule with a bifunctional iso(thio)cyanate group-containing compound (B1) having two iso(thio)cyanate groups in the molecule is preferably used as the polyiso(thio)cyanate compound (B).

The above bifunctional active hydrogen-containing compound (C1) is included in active hydrogen-containing compounds (C) which will be described in detail hereinafter and corresponds to a compound having two groups with active hydrogen in the molecule out of the active hydrogen-containing compounds (C).

The bifunctional iso(thio)cyanate group-containing compound (B1) corresponds to a compound having two iso(thio)cyanate groups in the molecule out of the compounds described for the above polyiso(thio)cyanate compound (B).

In the present invention, the urethane prepolymer (B2) obtained by reacting the above bifunctional iso(thio)cyanate group-containing compound (B1) with the above bifunctional active hydrogen-containing compound (C1) is preferably used as the polyiso(thio)cyanate compound (B). That is, as will be described in the section for the polymerization method below, it is preferred that the urethane prepolymer (B2) should be first prepared and then reacted (polymerized) with the above polyrotaxane (A) and optionally with the active hydrogen-containing compound (C) which will be described in detail hereinafter to produce the urethane resin (this method may be referred to as "prepolymer method" hereinafter). When the urethane prepolymer (B2) is reacted (polymerized) with the above polyrotaxane (A) and optionally with the active hydrogen-containing compound (C) which will be described in detail hereinafter, a combination of two or more urethane prepolymers (B2) which differ in constituent component or molecular weight may be used. When the prepolymer (B2) is used, another polyiso(thio) cyanate compound (B) may be optionally used at the same time.

To obtain the urethane prepolymer (B2), the following compounds are particularly preferably used as the bifunctional iso(thio)cyanate group-containing compound (B1) though not particularly limited. They are 1,5-naphthalene diisocyanate, xylene diisocyanate (o-, m-, p-), 2,4-tolylene diisocyanate, 2,6-tolylene diisocyanate, phenylene diisocyanate (o-, m-, p-), 2,2'-diphenylmethane diisocyanate, 2,4'-diphenylmethane diisocyanate and 4,4'-diphenylmethane diisocyanate.

Meanwhile, out of the active hydrogen-containing compounds (C) which will be described in detail hereinafter, any compound having two groups with active hydrogen (—OH, amino group, etc.) in the molecule may be used as the above bifunctional active hydrogen-containing compound (C1). As the bifunctional active hydrogen-containing compound constituting the urethane prepolymer (B2), the following compounds are preferably used. They are compounds having hydroxyl groups (two in the molecule) only at both ends of a polyester polyol molecule, compounds having hydroxyl groups (two in the molecule) only at both ends of a polyether polyol molecule, compounds having hydroxyl groups (two in the molecule) only at both ends of a polycaprolactone polyol molecule, compounds having hydroxyl groups (two in the molecule) only at both ends of a polycarbonate polyol molecule, ethylene glycol, diethylene glycol, propylene glycol, dipropylene glycol, butylene glycol, 1,5-dihydroxypentane, 1,6-dihydroxyhexane, 1,7-dihydroxyheptane, 1,8-dihydroxyoctane, 1,9-dihydroxynonane, 1,10-dihydroxydecane, 1,11-dihydroxyundecane, 1,2-dihydroxydodecane and neopentyl glycol.

At least one bifunctional active hydrogen-containing compound (C1) having a molecular weight (number average molecular weight) of 500 to 2,000 is preferably used to produce the urethane prepolymer (B2) so as to enable the finally obtained urethane resin to exhibit excellent characteristic properties. A combination of bifunctional active hydrogen-containing compounds which differ in type or molecular weight may be used as the bifunctional active hydrogen-containing compound (C1) having a molecular weight of 500 to 2,000. To control the hardness of the finally obtained urethane resin, a combination of a bifunctional active hydrogen-containing compound (C1) having a molecular weight (number average molecular weight) of 500 to 2,000 and a bifunctional active hydrogen-containing compound (C1) having a molecular weight (number average molecular weight) of 90 to 300 may also be used to form the urethane prepolymer (B2). In this case, depending on the types and amounts of the bifunctional active hydrogen-containing compound (C1) and the polyiso (thio) isocyanate compound (B) in use, when the amount of the bifunctional active hydrogen-containing compound (C1) having a molecular weight of 500 to 2,000 is 100 parts by mass, the amount of the bifunctional active hydrogen-containing compound (C1) having a molecular weight of 90 to 300 is preferably 1 to 100 parts by mass.

The urethane prepolymer (B2) must have an iso(thio) cyanate group at both ends of the molecule. Therefore, the urethane prepolymer (B2) is preferably produced to ensure that the number of moles (n1) of the iso(thio)cyanate groups in the bifunctional iso(thio)cyanate group-containing compound (B1) and the number of moles (n2) of the active hydrogens of the bifunctional active hydrogen-containing compound (C1) satisfy $1<(n1)/(n2)\leq 2.3$. When two or more compounds having an iso(thio)cyanate group at both ends of the molecule are used in combination, the number of moles (n1) of the iso(thio)cyanate groups is the total number of moles of the iso(thio)cyanate groups of these iso(thio) cyanate group-containing compounds (B1). When two or more bifunctional active hydrogen-containing compounds (C1) are used in combination, the number of moles of active hydrogens is the total number of moles of the active hydrogens of these bifunctional active hydrogen-containing compounds.

As will be described in detail hereinafter, in the case of the bifunctional active hydrogen-containing compound (C1) having an amino group, the number of moles of the amino group is equal to the number of moles of active hydrogens.

The iso(thio)cyanate equivalent (value obtained by dividing the molecular weight of the urethane prepolymer (B2) by the number of the iso(thio)cyanate groups in one molecule) of the above urethane prepolymer (B2) is preferably 300 to 5,000, more preferably 500 to 3,000, particularly preferably 700 to 2,000 though it is not particularly limited. Since the urethane prepolymer (B2) in the present invention is preferably linear and synthesized from the bifunctional iso(thio) cyanate group-containing compound (B1) and the bifunctional active hydrogen-containing compound (C1), the number of the iso(thio)cyanate groups in one molecule is 2.

When the urethane prepolymer (B2) is used, it may be used in combination with the bifunctional iso(thio)cyanate group-containing compound (B1). Even in this case, the above iso(thio)cyanate equivalent is preferably 300 to 5,000. That is, the average iso(thio)cyanate equivalent in the polyiso(thio)cyanate compound (B) containing the urethane prepolymer (B2) and the bifunctional iso(thio)cyanate group-containing compound (B1) is preferably 300 to 5,000. It is considered that when the average iso(thio)cyanate equivalent is 300 to 5,000, a polyiso(thio)cyanate compound having a certain molecular weight (B) is used, thereby obtaining an excellent effect.

In the present invention, it is preferred that the urethane prepolymer (B2) should be produced to ensure $1<(n1)/(n2) \leq 2$ so as to eliminate the use of the bifunctional iso(thio) cyanate group-containing compound (B1). That is, it is preferred that the iso(thio)cyanate equivalent of the urethane prepolymer (B2) should be set to 300 to 5,000 by using the polyiso(thio)cyanate compound (B) composed of only the urethane prepolymer (B2).

The iso(thio)cyanate equivalent of the urethane prepolymer (B2) can be obtained by determining the amount of the iso(thio)cyanate group of the urethane prepolymer (B2) in accordance with JIS K7301. The amount of the iso(thio) cyanate group can be determined by the following back titration method. The obtained urethane prepolymer (B2) is first dissolved in a dry solvent. Then, di-n-butylamine whose amount is apparently larger than the amount of the iso(thio) cyanate group of the urethane prepolymer (B) and whose concentration is known is added to the dry solvent to be reacted with all the iso(thio)cyanate groups of the urethane prepolymer (B2). Then, the amount of consumed di-n-butylamine is obtained by titrating unconsumed (not involved in the reaction) di-n-butylamine with an acid. Since the amount of the consumed di-n-butylamine is equal to the amount of the iso(thio)cyanate group of the urethane prepolymer (B2), the iso(thio)cyanate equivalent can be obtained. Since the urethane prepolymer (B2) is a linear urethane prepolymer having an iso(thio)cyanate group at both ends, the number average molecular weight of the urethane prepolymer (B2) is twice as large as the iso(thio) cyanate equivalent. The molecular weight of this urethane prepolymer (2) is apt to match a measurement value obtained by gel permeation chromatography (GPC). When the urethane prepolymer (B2) and the bifunctional iso(thio) cyanate group-containing compound (B1) are used in combination, a mixture of these should be measured by the above method.

The reason that the above urethane prepolymer (B2) has an iso(thio)cyanate equivalent of preferably 300 to 5,000, more preferably 500 to 3,000, particularly preferably 700 to 2,000 is unknown but considered as follows. That is, it is assumed that when the urethane prepolymer (B2) having a certain molecular weight reacts with the hydroxyl groups of the side chains of the polyrotaxane (A), a slidable molecule becomes big and moves greatly with the result that recovery from deformation (elastic recovery; low hysteresis) tends to occur. Further, it is also assumed that, due to the use of the urethane prepolymer (B2), the crosslinking points in the urethane resin are easily dispersed and existent at random and uniformly, thereby developing stable performance. It is further assumed that the urethane resin obtained by using the urethane prepolymer (B2) is easily controlled at the time of production and can be advantageously used as a polishing pad. It is considered that this effect is obtained even when the average iso(thio)cyanate equivalent of the polyiso(thio) cyanate compound is 300 to 5,000 at the time of using a combination of the urethane prepolymer (B2) and the bifunctional iso(thio)cyanate group-containing compound (B1). It is also considered that the above effect becomes remarkable when the urethane prepolymer (B2) is used alone.

Further, the above urethane prepolymer (B2) is preferably such that the content of iso(thio)cyanate ((I); molality (mol/kg)) in the urethane prepolymer (B2) which is obtained from the iso(thio)cyanate equivalent of the urethane prepolymer (B2) and the content of a (thio)urethane bond (including a (thio) urea bond) ((U); molality (mol/kg)) in the urethane prepolymer (B2) satisfy $1 \leq (U)/(I) \leq 10$. This range remains the same when the urethane prepolymer (B2) and the bifunctional iso(thio)cyanate group-containing compound (B1) are used in combination. In the present invention, it is preferred that the urethane prepolymer (B2) should be used alone. Although the reason for this is unknown, when the (thio)urethane bond (including the (thio)urea bond) is existent, interaction with another molecule tends to occur due to the function of a hydrogen bond, thereby making it possible to enhance the characteristic properties of the obtained urethane resin. The content of iso(thio)cyanate ((I); molality (mol/kg)) is a value obtained by multiplying the inverse of the iso(thio)cyanate equivalent by 1,000. The content of the (thio)urethane bond (including the (thio)urea bond) ((U) molality (mol/kg)) in the urethane prepolymer is theoretically obtained, for example, by the following method. That is, when the content of the iso(thio)cyanate groups before the reaction existent in the bifunctional active hydrogen-containing compound (C1) and the bifunctional iso(thio) cyanate group-containing compound (B1) constituting the urethane prepolymer (B2) is the total content of isocyanates ((aI); molality (mol/kg)), the content of the (thio)urethane bond (including the thio(urea bond) ((U); molality (mol/kg)) is a value ((U)=(aI)−(I)) obtained by subtracting the content of isocyanate ((I); molality (mol/kg)) from the content of all the iso(thio)isocyanate groups of the component (B) ((aI); molality (mol/kg)).

(Another Component Contained in Polymerizable Composition)

The urethane resin for polishing of the present invention is obtained by polymerizing a polymerizable composition comprising the above polyrotaxane (A) and the above polyiso(thio)cyanate compound (B). In the present invention, the above polymerizable composition may comprise another component in addition to the above two components.

As the component to be involved in polymerization, (C) an active hydrogen-containing compound having a group with active hydrogen except for the above polyrotaxane (A) may be contained. A description is subsequently given of this active hydrogen-containing compound (C).

<(C) Active Hydrogen-Containing Compound>

The active hydrogen-containing compound (C) (may be simply referred to as "component (C)" hereinafter) used in the present invention is a compound having a group with active hydrogen except for the above polyrotaxane (A). The group having active hydrogen is the same as those explained in the section (side chains of cyclic molecules of polyrotaxane (A)).

When the polymerizable composition used in the present invention comprises the component (C), the crosslinking density of the obtained urethane resin can be adjusted. As a result, it is considered that the obtained urethane resin exhibits an excellent effect.

As the above active hydrogen-containing compound (C), any compound having at least one group with active hydrogen may be used. It may have a plurality of groups with active hydrogen in one molecule. Further, a plurality of active hydrogen-containing compounds (C) may be used in combination. When a plurality of the compounds are used in combination, the basic mass amount of the component (C) is the total amount of these compounds. Examples of the active hydrogen-containing compound (C) used in the present invention are given below.

(Active Hydrogen-Containing Compound (C); Compound Having an OH Group)

An example of the compound having an OH group is a polyol compound. The polyol compound is a compound having at least two OH groups in one molecule.

Examples of the compound include compounds having OH at both ends of an alkylene group having 2 to 10 carbon atoms such as dimethyl-, trimethyl-, tetramethyl-, pentamethyl- and hexamethyl-dihydroxy compounds. Other typical examples include polyesters containing at least two OH groups in one molecule (polyester polyols), polyethers containing at least two OH groups in one molecule (polyether polyols), polycarbonates containing at least two OH groups in one molecule (polycarbonate polyols), polycaprolactones containing at least two OH groups in one molecule (polycaprolactone polyols) and acrylic polymers containing at least two OH groups in one molecule (polyacrylicpolyols).

These polyol compounds may contain a prepolymer prepared by a reaction with the above-described polyiso(thio) cyanate compound (B). In the above active hydrogen-containing compound (C), examples of the prepolymer of the polyol compound are known compounds having an unreacted OH group at both ends.

These compounds are listed below.

Aliphatic Alcohols;

Bifunctional active hydrogen-containing compounds (corresponding to the bifunctional active hydrogen-containing compound (C1) constituting the above urethane prepolymer (B2)) such as ethylene glycol, diethylene glycol, propylene glycol, dipropylene glycol, butylene glycol, 1,5-dihydroxypentane, 1,6-dihydroxyhexane, 1,7-dihydroxyheptane, 1,8-dihydroxyoctane, 1,9-dihydroxynonane, 1,10-dihydroxydecane, 1,11-dihydroxyundecane, 1,12-dihydroxydodecane, neopentyl glycol, glyceryl monooleate, monoelaidin, polyethylene glycol, 3-methyl-1,5-dihydroxypentane, dihydroxyneopentyl, 2-ethyl-1,2-dihydroxyhexane and 2-methyl-1,3-dihydroxypropane, and polyfunctional active hydrogen-containing compounds such as glycerin, trimethylolethane, trimethylolpropane, ditrimethylolpropane, trimethylolpropane tripolyoxyethylene ether (for example, TMP-30, TMP-60 and TMP-90 of Nippon Nyukazai Co., Ltd.), butane triol, 1,2-methyl glycoside, pentaerythritol, dipentaerythritol, tripentaerythritol, sorbitol, erythritol, threitol, ribitol, arabinitol, xylitol, allitol, mannitol, dorcitol, iditol, glycol, inositol, hexane triol, triglycerol, diglycerol and triethylene glycol Alicyclic Alcohols;

Bifunctional active hydrogen-containing compounds (corresponding to the bifunctional active hydrogen-containing compound (C1) constituting the above urethane prepolymer (B2)) such as hydrogenated bisphenol A, cyclobutanediol, cyclopentanediol, cyclohexanediol, cycloheptanediol, cyclooctanediol, cyclohexanedimethanol, hydroxypropyl cyclohexanol, tricyclo[5,2,1,0$^{2.6}$]decane-dimethanol, bicyclo[4,3,0]-nonanediol, cyclohexanediol, tricyclo[5,3,1,1$^{3.9}$] dodecanediol, bicyclo[4,3,0]nonanedimethanol, tricyclo[5,3,1,1$^{3.9}$]dodecane-diethanol, hydroxypropyl tricyclo[5,3,1,1$^{3.9}$]dodecanol, spiro[3,4]octanediol, butyl cyclohexanediol, 1,1'-bicyclohexylidene diol, 1,4-cyclohexane dimethanol, 1,3-cyclohexane dimethanol, 1,2-cyclohexane dimethanol and o-dihydroxy xylylene, and polyfunctional active hydrogen-containing compounds such as tris(2-hydroxyethyl)isocyanurate, cyclohexane triol, sucrose, maltitol and lactitol Aromatic Alcohols;

Bifunctional active hydrogen-containing compounds (corresponding to the bifunctional active hydrogen-containing compound (C1) constituting the above urethane prepolymer (B2)) such as dihydroxy naphthalene, dihydroxybenzene, bisphenol A, bisphenol F, xylylene glycol, tetrabromobisphenol A, bis(4-hydroxyphenyl)methane, 1,1-bis(4-hydroxyphenyl)ethane, 1,2-bis(4-hydroxyphenyl)ethane, bis(4-hydroxyphenyl)phenyl methane, bis(4-hydroxyphenyl)diphenyl methane, bis(4-hydroxyphenyl)-1-naphthyl methane, 1,1-bis(4-hydroxyphenyl)-1-phenyl ethane, 2-(4-hydroxyphenyl)-2-(3-hydroxyphenyl)propane, 2,2-bis(4-hydroxyphenyl)butane, 1,1-bis(4-hydroxyphenyl)butane, 2,2-bis(4-hydroxyphenyl)-3-methyl butane, 2,2-bis(4-hydroxyphenyl)pentane, 3,3-bis(4-hydroxyphenyl)pentane, 2,2-bis(4-hydroxyphenyl)hexane, 2,2-bis(4-hydroxyphenyl) octane, 2,2-bis(4-hydroxyphenyl)-4-methyl pentane, 2,2-bis (4-hydroxyphenyl)heptane, 4,4-bis(4-hydroxyphenyl)heptane, 2,2-bis(4-hydroxyphenyl)tridecane, 2,2-bis(4-hydroxyphenyl)octane, 2,2-bis(3-methyl-4-hydroxyphenyl) propane, 2,2-bis(3-ethyl-4-hydroxyphenyl)propane, 2,2-bis (3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-tert-butyl-4-hydroxyphenyl)propane, 2,2-bis(3-cyclohexyl-4-hydroxyphenyl)propane, 2,2-bis(3-allyl-4'-hydroxyphenyl) propane, 2,2-bis(3-methoxy-4-hydroxyphenyl)propane, 2,2-bis(3,5-dimethyl-4-hydroxyphenyl)propane, 2,2-bis(2,3,5,6-tetramethyl-4-hydroxyphenyl)propane, bis(4-hydroxyphenyl)cyanomethane, 1-cyano-3,3-bis(4-hydroxyphenyl)butane, 2,2-bis(4-hydroxyphenyl) hexafluoropropane, 1,1-bis(4-hydroxyphenyl)cyclopentane, 1,1-bis(4-hydroxyphenyl)cyclohexane, 1,1-bis(4-hydroxyphenyl)cycloheptane, 1,1-bis(3-methyl-4-hydroxyphenyl) cyclohexane, 1,1-bis(3,5-dimethyl-4-hydroxyphenyl)cyclohexane, 1,1-bis(3,5-dichloro-4-hydroxyphenyl) cyclohexane, 1,1-bis(3-methyl-4-hydroxyphenyl)-4-methyl cyclohexane, 1,1-bis(4-hydroxyphenyl)-3,3,5-trimethyl cyclohexane, 2,2-bis(4-hydroxyphenyl)norbornane, 2,2-bis (4-hydroxyphenyl)adamantane, 4,4'-dihydroxydiphenyl ether, 4,4'-dihydroxy-3,3'-dimethyldiphenyl ether, ethylene glycol bis(4-hydroxyphenyl)ether, 4,4'-dihydroxydiphenyl sulfide, 3,3'-dimethyl-4,4'-dihydroxydiphenyl sulfide, 3,3'-dicyclohexyl-4,4'-dihydroxydiphenyl sulfide, 3,3'-diphenyl-4,4'-dihydroxydiphenyl sulfide, 4,4'-dihydroxydiphenyl sulfoxide, 3,3'-dimethyl-4,4'-dihydroxydiphenyl sulfoxide, 4,4'-dihydroxydiphenyl sulfone, 4,4'-dihydroxy-3,3'-dimethyldiphenyl sulfone, bis(4-hydroxyphenyl)ketone, bis(4-hydroxy-3-methylphenyl)ketone, 7,7'-dihydroxy-3,3',4,4'-tetrahydro-4,4,4',4'-tetramethyl-2,2'-spirobi(2H-1-benzopyran), trans-2,3-bis(4-hydroxyphenyl)-2-butene, 9,9-bis(4-hydroxyphenyl)fluorene, 3,3-bis(4-hydroxyphenyl)-2-butanone, 1,6-bis(4-hydroxyphenyl)-1,6-hexanedione, 4,4'-dihydroxybiphenyl, m-dihydroxyxylylene, p-dihydroxyxylylene, 1,4-bis(2-hydroxyethyl)benzene, 1,4-bis(3-hydroxypropyl)benzene, 1,4-bis(4-hydroxybutyl)benzene, 1,4-bis(5-hydroxypentyl)benzene, 1,4-bis(6-hydroxyhexyl)benzene, 2,2-bis(4-(2"-hydroxyethyloxy)phenyl) propane, hydroquinone and resorcin, and polyfunctional active hydrogen-containing compounds such as trihydroxy naphthalene, tetrahydroxy naphthalene, benzene triol, biphenyl tetraol, pyrogallol, (hydroxynaphthyl) pyrogallol and trihydroxy phenanthrene.

Polyester polyols; Compounds obtained by a condensation reaction between a polyol and a polybasic acid. The compounds have a number average molecular weight of preferably 400 to 2,000, more preferably 500 to 1,500, most preferably 600 to 1,200. Compounds having (two in the molecule) hydroxyl groups only at both ends of the molecule correspond to the bifunctional active hydrogen-containing compound (C1) constituting the above urethane prepolymer (B2).

Polyether polyols; Compounds obtained by the ring-opening polymerization of alkylene oxide or a reaction between a compound having at least two active hydrogen-containing groups in the molecule and alkylene oxide, and modified products thereof. The compounds have a number average molecular weight of preferably 400 to 2,000, more preferably 500 to 1,500, most preferably 600 to 1,200. Compounds having (two in the molecule) hydroxyl groups only at both ends of the molecule correspond to the bifunctional active hydrogen-containing compound (C1) constituting the above urethane prepolymer (B2).

Polycaprolactone polyols; Compounds obtained by the rig-opening polymerization of ε-caprolactone. The compounds have a number average molecular weight of preferably 400 to 2,000, more preferably 500 to 1,500, most preferably 600 to 1,200. Compounds having (two in the molecule) hydroxyl groups only at both ends of the molecule correspond to the bifunctional active hydrogen-containing compound (C1) constituting the above urethane prepolymer (B2).

Polycarbonate polyols; Compounds obtained by the phosgenation of at least one low-molecular weight polyol or compounds obtained by transesterification using ethylene carbonate, diethyl carbonate or diphenyl carbonate. The compounds have a number average molecular weight of preferably 400 to 2,000, more preferably 500 to 1,500, most preferably 600 to 1,200. Compounds having (two in the molecule) hydroxyl groups only at both ends of the molecule correspond to the bifunctional active hydrogen-containing compound (C1) constituting the above urethane prepolymer (B2).

Polyacrylic polyols; Compounds obtained by copolymerizing an acrylic acid ester or methacrylic acid ester having a hydroxyl group with a monomer copolymerizable with these esters. Compounds having (two in the molecule) hydroxyl groups only at both ends of the molecule correspond to the bifunctional active hydrogen-containing compound (C1) constituting the above urethane prepolymer (B2).

Acrylic polyols; Polyol compounds obtained by polymerizing a (meth)acrylic acid ester or vinyl monomer. Compounds having (two in the molecule) hydroxyl groups only at both ends of the molecule correspond to the bifunctional active hydrogen-containing compound (C1) constituting the above urethane prepolymer (B2).

Compounds having an OH group out of the above active hydrogen-containing compounds (C) include monool compounds besides the polyol compounds. The monool compounds have one OH group in one molecule. Examples of these compounds are given below.

Monool compounds; polyethylene glycol monooleyl ether, polyoxyethylene monooleate, polyethylene glycol monolaurate, polyethylene glycol monostearate, polyethylene glycol mono-4-octylphenyl ether, linear polyoxyethylene alkyl ethers (polyethylene glycol monomethyl ether, polyoxyethylene lauryl ether, polyoxyethylene-2-ethylhexyl ether, polyoxyethylene tridecyl ether, polyoxyethylene cetyl ether, polyoxyethylene stearyl ether), polypropylene glycol monomethyl ether, glyceryl dioleate, and linear or branched saturated alkyl alcohols having 5 to 30 carbon atoms The compounds listed above should become compounds having an OH group at the time of a reaction. That is, they may be compounds having a group capable of forming an OH group at a reaction site, more specifically, an epoxy group.

In the present invention, out of the above compounds, a polyhydric alcohol compound having two or three OH groups in the molecule is preferably used. As a compound except for the diol compounds, a monool compound having one OH group in the molecule is preferably used.

(Active Hydrogen-Containing Compound (C) SH Group-Containing Compound)

Examples of the active hydrogen-containing compound (C) having an SH group (thiol group) are given below. The compounds having an SH group are, for example, polythiol compounds. The polythiol compounds are compounds having at least two SH groups in one molecule. These polythiol compounds may contain a prepolymer prepared by a reaction with the above-described polyiso(thio)cyanate compound (B) like the above-described polyol compounds. (As the prepolymer of the polythiol compound as the active hydrogen-containing compound (C), a prepolymer which contains an unreacted SH group and is generally used may be used in the present invention.)

Examples of these compounds are given below.

Aliphatic Thiol Compounds;

Bifunctional active hydrogen-containing compounds (corresponding to the bifunctional active hydrogen-containing compound (C1) constituting the above urethane prepolymer (B2)) such as 1,3-propanedithiol, 1,6-hexanedithiol, 1,10-decanedithiol, 1,8-octanedithiol, 1,4-butanediol bis(3-mercaptopropionate), 1,4-butanediol bis(thioglycolate), 1,6-hexanediol bis(thioglycolate), tetraethylene glycol bis(3-mercaptopropionate) and 1,6-hexandiol bis(3-mercaptopropionate), and polyfunctional active hydrogen-containing compounds such as tetrakis(mercaptomethyl) methane, trimethylolpropane tris(3-mercaptopropionate), trimethylolethane tris(3-mercaptobutyrate), pentaerythritol tetrakis(3-mercaptopropionate), dipentaerythritol hexakis(3-mercaptopropionate) and pentaerythritol tetrakis(3-mercaptobutyrate).

Alicyclic Thiol Compounds;

1,4-bis(mercaptopropylthiomethyl)benzene and 2,5-bis (mercaptomethyl)-1,4-dithiane. They correspond to the bifunctional active hydrogen-containing compound (C1).

Aromatic Thiol Compounds;

4,6-bis(mercaptomethylthio)-1,3-dithiane

Other SH group compounds include monothiol compounds. The monothiol compounds should have one thiol group in one molecule, and examples thereof are given below.

Monothiol compounds; 3-methoxybutyl 3-mercaptopropionate, ethyl 3-mercaptopropionate and saturated alkyl thiols having a linear or branched structure and 5 to 30 carbon atoms Compounds having an amino group are given below.

(Active Hydrogen-Containing Compound (C) Amino Group-Containing Compounds (CA))

Compounds having a primary or secondary amino group of the present invention may be used without restriction. They are roughly classified into aliphatic amines, alicyclic amines, aromatic amines and polyamine compounds, and examples thereof are given below.

Aliphatic Amines;

Bifunctional active hydrogen-containing compounds (corresponding to the bifunctional active hydrogen-containing compound (C1) constituting the urethane prepolymer (B2)) such as ethylenediamine, hexamethylenediamine, nonamethylenediamine, undecanemethylenediamine, dodecamethylenediamine, metaxylenediamine, 1,3-propanediamine and putrescine, polyfunctional active hydrogen-containing compounds such as diethylene triamine, and monofunctional active hydrogen-containing compounds such as butylamine, hexylamine, dodecylamine, octylamine, diethylamine, di-n-propylamine, diisopropylamine, di-n-butylamine, diisobutylamine, di-t-butylamine, dihexylamine, di(2-ethylhexyl)amine, N-isopropyl-N-isobutylamine, di-sec-butylamine and N-methylhexylamine Alicyclic amines; bifunctional active hydrogen-containing compounds (corresponding to the bifunctional active hydrogen-containing compound (C1) constituting the above urethane prepolymer (B2)) such as isophoronediamine and cyclohexyldiamine, and monofunctional active hydrogen-containing compounds such as cyclohexylamine Aromatic Amines;

Bifunctional active hydrogen-containing compounds (corresponding to the bifunctional active hydrogen-containing compound (C1) constituting the above urethane prepolymer (B2)) such as 4,4'-methylenebis(o-chloroaniline) (MOCA), 2,6-dichloro-p-phenylenediamine, 4,4'-methylenebis(2,3-dichloroaniline), 4,4'-methylenebis(2-ethyl-6-methylaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethylene glycol-di-p-aminobenzoate, polytetramethylene glycol-di-p-aminobenzoate, 4,4'-diamino-3,3',5,5'-tetraethyldiphenyl methane, 4,4'-diamino-3,3'-diisopropyl-5,5'-dimethyldiphenyl methane, 4,4'-diamino-3,3',5,5'-tetraisopropyldiphenyl methane, 1,2-bis(2-aminophenylthio)ethane, 4,4'-diamino-3,3'-diethyl-5,5'-dimethyldiphenyl methane, N,N'-di-sec-butyl-4,4'-diaminodiphenyl methane, 3,3'-diethyl-4,4'-diaminodiphenyl methane, m-xylylenediamine, N,N'-di-sec-butyl-p-phenylenediamine, m-phenylenediamine, p-xylylenediamine, p-phenylenediamine, 3,3'-methylenebis (methyl-6-aminobenzoate), 2-methylpropyl 2,4-diamino-4-chlorobenzoate, isopropyl 2,4-diamino-4-chlorobenzoate, isopropyl 2,4-diamino-4-chlorophenylacetate, di-(2-aminophenyl)thioethyl terephthalate, diphenymethane diamine, tolylenediamine and piperazine, polyfunctional active hydrogen-containing compounds such as 1,3,5-benzene triamine and melamine, and monofunctional active hydrogen-containing compounds such as 2-methylpiperidine, 3-methylpiperidine, 4-methylpiperidine, piperidine, 2,4-dimethylpiperidine, 2,6-dimethylpiperidine, 3,5-dimethylpiperidine, morpholine, pyrrole and N-methylbenzylamine.

They may be used alone or in combination of two or more. In the above amino group-containing compounds (CA), strictly speaking, the amino group (—NH$_2$) has two active hydrogens. In the present invention, in consideration of the reactivity of the active hydrogens of the amino group, the number of moles of the active hydrogens of the compound having an amino group should be equal to the number of moles of the amino group. As for a reaction between an amino group and an iso(thio)cyanate group, one active hydrogen in the amino group first reacts with one iso(thio)cyanate group to form a urea bond thiourea bond. The active hydrogens in this bond (—NHCONH—, —NHCSNH—) are not involved in the next reaction unless the temperature is high, for example, 150° C. or higher. Therefore, in the present invention, 1 mole of the iso(thio)cyanate group and 1 mole of the amino group (1 mole of active hydrogen in the amino group) reacts with each other substantially. Consequently, in the present invention, when a compound having an amino group such as the amino group-containing compound (CA) is used, the number of moles of the active hydrogens of the compound having an amino group should be equal to the number of moles of the amino group. As a matter of course, in the case of an amino group-containing compound (CA) having a secondary amine group (for example, —NHR) which reacts with the iso(thio)cyanate group, the number of moles of the active hydrogens of this compound having an amino group should be equal to the number of moles of the amino group as well.

(Active Hydrogen-Containing Compound (C) Composite Active Hydrogen-Containing Compound)

The composite active hydrogen-containing compound has different types of groups having active hydrogen in the molecule and therefore, the use of this active hydrogen-containing compound makes it possible to adjust various physical properties.

Examples of this composite active hydrogen-containing compound include OH/SH type compounds having an OH group and an SH group and OH/amino group type compounds having an OH group and an amino group. The following compounds are examples thereof.

OH/SH Type Compounds;

Bifunctional active hydrogen-containing compounds (corresponding to the bifunctional active hydrogen-containing compound (C1) constituting the above urethane prepolymer (B2)) such as 1-hydroxy-4-mercaptocyclohexane, polyfunctional active hydrogen-containing compounds such as 3-mercapto-1,2-propanediol, 1,3-dimercapto-2-propanol, 2,3-dimercapto-1-propanol, pentaerythritol tris(3-mercaptopropionate), pentaerythritol mono(3-mercaptopropionate) and pentaerythritol bis(3-mercaptopropionate), and monofunctional active hydrogen-containing compounds such as 4-mercaptophenol.

OH/amino group type compounds; bifunctional active hydrogen-containing compounds (corresponding to the bifunctional active hydrogen-containing compound (C1) constituting the above urethane prepolymer (B2)) such as monoethanolamine and monopropanolamine, and polyfunctional active hydrogen-containing compounds such as diethanolamine and 2-(2-aminoethylamino) ethanol. They are also included in the amino group-containing compounds (CA). As a matter of course, the number of moles of active hydrogens of the amino group in these compounds is considered to be equal to the number of moles of the amino group, and the number of moles of active hydrogens is considered as the total of the number of moles of the amino group and the number of moles of the hydroxyl group.

They may be used alone or in combination of two or more.

(Preferred Active Hydrogen-Containing Compound (C))

As the above-described component (C), active hydrogen-containing compounds having an OH group and an amino group as groups having active hydrogens which can be advantageously used are particularly preferred from the viewpoints of reactivity and odor produced at the time of the abrasion of the obtained polyurethane resin. The optimum component (C) and the amount thereof differ according to the production method of the urethane resin. That is, they differ according to a method of producing the polyurethane resin by reacting the polyrotaxane (A), the polyiso(thio)cyanate compound (B) (excluding the urethane prepolymer (B2)) and the active hydrogen-containing compound (C) at the same time (may be simply referred to as "one-pot method" hereinafter) and a method of producing the urethane resin by using the above urethane prepolymer (B2). A description is subsequently given of the difference between them.

(Preferred Active Hydrogen-Containing Compound (C) in One-Pot Method)

To produce the urethane resin by the one-pot method, an aliphatic polyol (preferably a polyhydric alcohol having at least 3 hydroxyl groups in the molecule) or a combination of a polyhydric alcohol having at least 3 hydroxyl group in the molecule and a diol (compound having two hydroxyl groups in the molecule) is preferably used when physical properties, handling ease and the productivity of the urethane resin are taken into consideration.

(Preferred Active Hydrogen-Containing Compound (C) in Prepolymer Method)

Meanwhile, in the prepolymer method using the urethane prepolymer (B2), the urethane resin having a high molecular weight is produced by reacting (polymerizing) the iso(thio)cyanate group of the urethane prepolymer (B2) with the groups having active hydrogen in the above polyrotaxane (A) and the above active hydrogen-containing compound (C). In this method, the following active hydrogen-containing compound (C) is preferably used. That is, when the urethane prepolymer (B2) is used, amino group-containing compounds (CA) having an amino group are preferably used. Out of the amino group-containing compounds (CA), 4,4'-methylenebis(o-chloroaniline) (may be simply referred to as "MOCA" hereinafter), trimethylene glycol-di-p-aminobenzoate and polytetramethylene glycol-di-p-aminobenzoate are preferably used.

The reason for this is unknown but considered as follows. That is, the urethane resin obtained by the prepolymer method hardly has a higher crosslinking degree than a urethane resin obtained by the one-pot method though its molecular structure is easily controlled. By using the above amino group-containing compound (CA) in the prepolymer method, the obtained urethane resin becomes a urethane urea resin having a urea bond. It is considered that the urea bonds may take a pseudo-crosslinked structure by a hydrogen bond, or the urea bond is reacted (polymerized) with the iso(thio)cyanate group of the urethane prepolymer (B2) to take a crosslinked structure, thereby making it possible to improve the mechanical strength of the obtained urethane resin.

(Blending Ratio of Polymerizable Composition)

The polymerizable composition used in the present invention is not particularly limited but preferably comprises 3 to 2,000 parts by mass of the polyiso(thio)cyanate compound (B) based on 100 parts by mass of the above polyrotaxane (A) to exhibit an excellent effect. When the amount of the above polyrotaxane (A) is too small in the obtained urethane resin, the effect of improving abrasion resistance due to high mobility that the polyrotaxane (A) basically has tends to become small. When the amount of the polyrotaxane (A) is too large, the effect of improving abrasion resistance by crosslinking tends to become small as well. Although it is considered that the dispersibility of the polyiso(thio)cyanate compound (B) in the polymerizable composition deteriorates, the production of a urethane resin having crosslinking points dispersed uniformly tends to become difficult. Therefore, the above polymerizable composition comprises more preferably 4 to 1,500 parts by mass, much more preferably 5 to 1,000 parts by mass of the polyiso(thio)cyanate compound (B) based on 100 parts by mass of the polyrotaxane (A).

(Preferred Blending Ratio in One-Pot Method (when Active Hydrogen-Containing Compound (C) is not Used))

To react the above polyrotaxane (A) with the polyiso(thio)cyanate compound (B) by the one-pot method, the amount of the polyiso(thio)cyanate compound (B) is preferably 5 to 50 parts by mass based on 100 parts by mass of the polyrotaxane (A) from the viewpoint of excellent mechanical properties.

(Preferred Blending Ratio in Prepolymer Method (when Active Hydrogen-Containing Compound (C) is not Used))

To react the above polyrotaxane (A) with the urethane prepolymer (B2), the amount of the urethane prepolymer (B2) is preferably 20 to 1,000 parts by mass based on 100 parts by mass of the polyrotaxane (A) from the viewpoint of excellent mechanical properties.

(Blending Ratio (when Active Hydrogen-Containing Compound (C) is Used))

When the above polymerizable composition comprises the above active hydrogen-containing compound (C), it preferably comprises 10 to 3,000 parts by mass of the above polyiso(thio)cyanate compound (B) and 3 to 2,000 parts by mass of the above active hydrogen-containing compound (C) based on 100 parts by mass of the above polyrotaxane (A). An excellent effect is obtained when a certain amount of the above polyrotaxane (A) is existent in the urethane resin obtained from the polymerizable composition. Therefore, the polymerizable composition comprises preferably 15 to 2,500 parts by mass of the above polyiso(thio)cyanate compound (B) and 4 to 1,000 parts by mass of the above active hydrogen-containing compound (C), more preferably 20 to 1,500 parts by mass of the above polyiso(thio)cyanate compound (B) and 5 to 500 parts by mass of the above active hydrogen-containing compound (C) based on 100 parts by mass of the polyrotaxane (A).

(Preferred Blending Ratio in One-Pot Method (when Active Hydrogen-Containing Compound (C) is Used))

When the above polyrotaxane (A) is to be reacted with the polyiso(thio)cyanate compound (B) and the active hydrogen-containing compound (C) by the one-pot method, as for the blending ratio thereof, preferably, the amount of the polyiso(thio)cyanate compound (B) is 20 to 500 parts by mass and the amount of the active hydrogen-containing compound (C) is 50 to 500 parts by mass based on 100 parts by mass of the polyrotaxane (A) to obtain excellent mechanical properties.

(Preferred Blending Ratio in Prepolymer Method (when Active Hydrogen-Containing Compound (C) is Used))

When the above polyrotaxane (A) is to be reacted with the urethane prepolymer (B2) and the active hydrogen-containing compound (C), as for the blending ratio thereof, preferably, the amount of the urethane prepolymer (B2) is 50 to 1,500 parts by mass and the amount of the active hydrogen-containing compound (C) is 5 to 200 parts by mass based on 100 parts by mass of the polyrotaxane (A) to obtain excellent mechanical properties.

(Particularly Preferred Blending Ratio when Active Hydrogen-Containing Compound (C) is Used)

Although the preferred amounts of the components of the polymerizable composition used in the present invention are as described above, in the present invention, the components of the polymerizable composition are preferably adjusted to satisfy the above blending ratio and the following conditions. That is, the ratio of the total of the number of moles of the groups having active hydrogen of the above polyrotaxane (A) and the number of moles of the groups having active hydrogen of the above active hydrogen-containing compound (C) which is optionally used (may be referred to as "number of moles of all the groups having active hydrogen" hereinafter) and the number of moles of the iso(thio)cyanate groups of the above polyiso(thio)cyanate compound (B) (the iso(thio)cyanate groups of the urethane prepolymer (B2) in the prepolymer method) preferably falls within the following range.

Stated more specifically, when the number of moles of the above iso(thio)cyanate groups is 1, the number of moles of all the groups having active hydrogen is preferably 0.8 to 1.2. When the number of the above iso(thio)cyanate groups is too large or too small, a curing failure tends to occur or abrasion resistance tends to deteriorate in the obtained urethane resin. To obtain a urethane resin which is well cured, homogeneous and excellent in abrasion resistance, when the number of moles of the above iso(thio)cyanate groups is 1, the number of moles of all the groups having active hydrogen becomes more preferably 0.85 to 1.15, much more preferably 0.9 to 1.1.

(Polymerization Method of Polymerizable Composition)

In the present invention, to obtain a urethane resin for polishing, the above polymerizable composition should be polymerized. This polymerization method is not particularly limited, and an ordinary method in which a compound having a group with active hydrogen and a compound having an iso(thio)cyanate group are polymerized to obtain a polyurethane resin can be employed. Stated more specifically, a dry method such as the one-pot method and the prepolymer method, and a wet method using a solvent may be used. The dry method can be advantageously used in the present invention.

For example, in the one-pot method, in the above polymerizable composition, the above polyrotaxane (A) (component (A)) and the polyiso(thio)cyanate compound (B) (component (B)) should be polymerized at the same time. When the active hydrogen-containing compound (C) (component (C)) is existent, the urethane resin can be obtained by polymerizing the component (C) at the same time. When the component (A) is solid and does not melt, after it is mixed with the component (C), the resulting mixture can be reacted with the component (B).

In the prepolymer method, for example, the component (B) is first reacted with the component (C) to prepare the urethane prepolymer (B2) having iso(thio)cyanate groups at the ends of the molecule which is then mixed and reacted with the component (A). At this point, the prepolymer (B2) can be reacted, and the composition comprising not only the component (A) but also the components (B) and (C) can also be reacted as a matter of course. When the above prepolymer does not have an iso(thio)cyanate group and has groups with active hydrogen, the above active hydrogen-containing prepolymer should be reacted with the component (A) and the component (B). At this point, a polymerizable composition can also be obtained by reacting a composition comprising the component (C) except for the active hydrogen-containing prepolymer in addition to the components (A) and (B) with the above active hydrogen-containing prepolymer. For the control of the reaction (polymerization), it is preferred to use the urethane prepolymer (B2) having iso(thio)cyanate groups at the ends of the molecule. When the component (C) to be reacted with the urethane prepolymer (B2) is used, the component (C) is preferably an amine group-containing compound (CA).

(Other Properties of Obtained Urethane Resin, Additives)

Pores may be formed in the urethane resin of the present invention. Any known foaming method may be used. Examples of the method include a foaming agent foaming method in which a volatile foaming agent such as low-boiling point hydrocarbon or water is added, a method in which micro-balloons are dispersed and cured, a method in which thermally expandable fine particles are mixed and heated to be foamed, and a mechanical froth foaming method in which air or an inert gas such as nitrogen is blown during mixing. When the urethan resin is foamed, the density of the urethane resin is preferably 0.4 to 0.9 g/cm$^3$. In the case of water foaming, after water is reacted with an iso(thio)cyanate group, carbon dioxide and amino group are produced and the amino group further reacts with an iso (thio)cyanate group to form a urea bond/thiourea bond. Therefore, in the present invention, when water is used as an additive, water has two active hydrogens.

The urethane resin can be used as a polishing pad due to its excellent mechanical properties. The urethane resin of the present invention may have any suitable hardness. The hardness can be measured by a Shore method, for example, in accordance with JIS (hardness test) K6253. The urethane resin of the present invention preferably has a Shore hardness of 40A to 90D. The Shore hardness of the polyurethane resin for general polishing materials used in the present invention is preferably 20D to 90D, more preferably 20D to 80D (D means Shore "D" scale hardness). When it is used in the application field in which a relatively soft polishing pad is required, the Shore hardness of the urethane resin of the present invention is preferably 40A to 90A, more preferably 50A to 90A ("A" means Shore "A" scale hardness). Thus, desired hardness is obtained by changing the formulation and amounts of the components as required.

Preferably, the polyurethane resin of the present invention has a certain range of compressibility to obtain the flatness of a polished object. The compressibility can be measured, for example, by a method based on JIS L1096. The compressibility of the urethane resin of the present invention is preferably 0.5 to 50%. Within this range, the excellent flatness of the polished object can be obtained.

Since the polyurethane resin of the present invention has a low hysteresis loss or excellent elastic recovery, when it is used as a polishing pad, the flatness of the polished object and a high polishing rate can be realized. The hysteresis loss can be measured, for example, by a method based on JIS K6251. Stated more specifically, the hysteresis loss (area of elongation and stress when elongated and returned to original state/area of elongation and stress when elongated×100) can be measured by elongating a test specimen prepared in a dumbbell-like form by 100% and returning it to the original state.

Although not particularly limited, the hysteresis loss of the urethane resin of the present invention is preferably not more than 60%, more preferably not more than 50%, much more preferably not more than 40%. When the hysteresis loss becomes low and the urethane resin is used as a polishing pad, it is assumed that the kinetic energy of abrasive grains can be used uniformly for the polishing of the object to be polished, thereby making it possible to obtain excellent flatness and a high polishing rate. Further, it is considered that, when the hysteresis loss becomes low, even in the case of a soft pad, an excellent polishing rate can be obtained.

The urethane resin of the present invention may have a plurality of polishing layers. For example, when the urethane resin of the present invention consists of two layers, the above polishing layers may include a first layer having a polishing surface in contact with the object to be polished and a second layer in contact with the first layer on the side opposite to the polishing surface of the first layer. In this case, the second layer has hardness and elastic modulus which differ from those of the first layer, thereby making it possible to adjust the physical properties of the first layer. For example, the polishing property of the object to be polished can be adjusted by making the hardness of the first layer different from the hardness of the second layer.

The urethane resin of the present invention may be prepared as so-called "fixed abrasive grain urethane resin" by containing abrasive grains therein as a constituent element. For example, the abrasive grains are grains made of a material selected from cerium oxide, silicon oxide, alumina, silicon carbide, zirconia, iron oxide, manganese dioxide, titanium oxide and diamond or grains made of two or more of these. Although the method of holding these abrasive grains is not particularly limited, after the abrasive grains are dispersed in the above polymerizable composition, they can be held inside the urethane resin by curing the polymerizable composition.

In addition, polymerization catalyst, stabilizer such as antioxidant, ultraviolet absorbent, surfactant, flame retardant, plasticizer, pigment, filler, antistatic agent, foam stabilizer, and other additives may be added to the urethane resin of the present invention. These additives may be used alone or in combination of two or more. When these additives are contained in the polymerizable composition and the polymerizable composition is cured, they can be contained in the urethane resin for polishing.

A groove structure may be formed in the surface of the urethane resin of the present invention though it is not particularly limited. The groove structure is not particularly limited if it has a form for holding and renewing a slurry at the time of polishing the member to be polished. For example, the groove may be an X (stripe) groove, XY lattice groove, concentric groove, through hole, not through hole, polygonal prism, cylindrical, spiral groove, eccentric groove, radial groove or a combination thereof.

Although the method of forming the above groove structure is not particularly limited, for example, a method in which a jig such as a polishing tool having a predetermined size is used to mechanically cut a resin, a method in which a resin is poured into a mold having a predetermined surface shape and cured, a method in which a resin is pressed with a press plate having a predetermined surface shape, a method using photolithography and a method using a printing technique and a method using a laser beam from a carbon dioxide laser may be employed.

The urethane resin of the present invention may also be used as a nonwoven urethane resin polishing pad which is obtained by impregnating nonwoven cloth with the urethane resin of the present invention and curing the urethane resin.

EXAMPLES

The following examples and comparative examples are provided for the purpose of further illustrating the present invention but are in no way to be taken as limiting.

Evaluation methods in the following examples and comparative examples are described below.
(Used Polyrotaxane (A))

RX-1: polyrotaxane having a weight average molecular weight of 200,000 and side chains having a hydroxyl group and an average molecular weight of about 350

RX-2: polyrotaxane having a weight average molecular weight of 350,000 and side chains having a hydroxyl group and an average molecular weight of about 650

RX-3: polyrotaxane having a weight average molecular weight of 300,000 and side chains having a hydroxyl group and an average molecular weight of about 450
(Measurement of Molecular Weight; Gel Permeation Chromatography (GPC Measurement))

A liquid chromatograph (manufactured by Nihon Waters K.K.) was used as an apparatus for GPC measurement. The Shodex GPC KF-802 (exclusion limit molecular weight: 5,000), KF802.5 (exclusion limit molecular weight: 20,000), KF-803 (exclusion limit molecular weight: 70,000), KF-804 (exclusion limit molecular weight: 400,000) or KF-805 (exclusion limit molecular weight: 2,000,000) of Showa Denko K.K. was used as a column according to the molecular weight of a sample to be analyzed. Dimethyl formamide (DMF) was used as a developing solution to measure at a flow rate of 1 ml/min and a temperature of 40° C. Polystyrene was used as a reference sample to obtain the weight average molecular weight by comparative conversion. A differential refractometer was used as a detector.
<Production Method of Used Polyrotaxane (A)>

Production Example (Production of RX-1)

(1-1) Preparation of PEG-COOH;

Linear polyethylene glycol (PEG) having a molecular weight of 10,000 was prepared as a polymer for forming an axial molecule.
Formulation;

10 g of PEG, 100 mg of TEMPO (2,2,6,6-tetramethyl-1-piperidinyloxy radical) and 1 g of sodium bromide were prepared and dissolved in 100 mL of water. 5 mL of a commercially available sodium hypochlorate aqueous solution (effective chlorine content of 5%) was added to this solution and stirred at room temperature for 10 minutes. Thereafter, a maximum of 5 mL of ethanol was added to terminate the reaction. After extraction was made by using 50 mL of methylene chloride, methylene chloride was distilled off, the extract was dissolved in 250 mL of ethanol, and re-precipitation was carried out at −4° C. for 12 hours to collect and dry PEG-COOH.
(1-2) Preparation of Polyrotaxane;

3 g of PEG-COOH prepared above and 12 g of α-cyclodextrin (α-CD) were each dissolved in 50 mL of 70° C. hot water, and the obtained solutions were fully mixed together by shaking. Then, this mixed solution was reprecipitated at 4° C. for 12 hours, and the precipitated clathrate complex was freeze-dried and collected. After 0.13 g of adamantanamine was dissolved in 50 ml of dimethyl formamide (DMF) at room temperature, the above clathrate complex was added to and fully mixed with the resulting solution quickly by shaking. Subsequently, a solution prepared by dissolving 0.38 g of a BOP reagent (benzotriazol-1-yl-oxy-tris(dimethylamino)phosphonium hexafluorophosphate) in DMF was further added and fully mixed by shaking. Further, a solution prepared by dissolving 0.14 ml of diisopropylethylamine in DMF was added and fully mixed by shaking to obtain a slurry reagent.

The slurry reagent obtained above was left to stand at 4° C. for 12 hours. Thereafter, 50 ml of a DMF/methanol mixed solvent (volume ratio of 1/1) was added to and mixed with the reagent, and the obtained mixture was then centrifuged to discard the supernatant. After the resulting product was washed with the above DMF/methanol mixed solution, it was washed by using methanol and centrifuged to obtain a precipitate. After the obtained precipitate was vacuum dried, it was dissolved in 50 mL of dimethyl sulfoxide (DMSO), and the obtained transparent solution was added dropwise to 700 mL of water to precipitate a polyrotaxane. The precipitated polyrotaxane was collected by centrifugation and vacuum dried. Further, the polyrotaxane was dissolved in DMSO, precipitated in water, collected and dried to obtain a purified polyrotaxane. The clathration amount of α-CD was 0.25.

The clathration amount was calculated by dissolving the polyrotaxane in deuterated dimethyl sulfoxide (DMSO-d6) and measuring with a $^1$H-NMR measuring instrument (JNM-LA500 of JEOL Ltd.) in accordance with the following method.

X, Y and X/(Y−X) mean the following.
X: integrated value of proton derived from hydroxyl group of 4 to 6 ppm of cyclodextrin
Y: integrated value of proton derived from methylene chains of 3 to 4 ppm of cyclodextrin and PEG
X/(Y−X): proton ratio of cyclodextrin to PEG X/(Y−X) when the maximum clathration amount is theoretically 1 is first calculated and then compared with X/(Y−X) calculated from the analytical value of the actual compound to calculate the clathration amount.
(1-3) Introduction of Side Chains into Polyrotaxane;

500 mg of the above purified polyrotaxane was dissolved in 50 mL of a 1 mol/L NaOH aqueous solution, and 3.83 g (66 mmol) of propylene oxide was added to the resulting solution and stirred in an argon atmosphere at room temperature for 12 hours. Then, the above polyrotaxane solution was neutralized to a pH of 7 to 8 by using a 1 mol/L HCl aqueous solution, dialyzed with a dialysis tube and freeze-dried to obtain a hydroxypropylated polyrotaxane. The obtained hydroxypropylated polyrotaxane was identified by $^1$H-NMR and GPC and confirmed as a hydroxypropylated polyrotaxane having a desired structure.

The modification degree of the OH groups of the cyclic molecules by the hydroxypropyl group was 0.5, and the weight average molecular weight Mw measured by GPC was 50,000.

A mixed solution was prepared by dissolving 5 g of the obtained hydroxypropylated polyrotaxane in 15 g of ε-caprolactone at 80° C. After this mixed solution was stirred at 110° C. for 1 hour while dry nitrogen was blown, 0.16 g of a 50 wt % xylene solution of tin(II) 2-ethylhexanoate was added to this mixed solution and stirred at 130° C. for 6 hours. Thereafter, xylene was added to obtain a polycaprolactone-modified polyrotaxane xylene solution having a nonvolatile content of about 35 mass % into which side chains have been introduced.

(1-4) Preparation of OH Group-Introduced Side Chain-Modified Polyrotaxane (RX-1; Corresponding to Polyrotaxane (A) Used in the Present Invention)

The polycaprolactone-modified polyrotaxane xylene solution prepared above was added dropwise to hexane, collected and dried to obtain a side chain-modified polyrotaxane (RX-1) having OH groups at the ends of the side chains.

The physical properties of this polyrotaxane (A); RX-1 were as follows.
Weight average molecular weight Mw of polyrotaxane (GPC): 200,000
Side chain modification degree: 0.5 (50%)
Side chain molecular weight: about 350 on average
This is the polyrotaxane (A) having hydroxyl groups at the ends of the side chains.

<Production of RX-2>
RX-2 was prepared in the same manner as RX-1 except that the amount of ε-caprolactone was changed to 30 g. The physical properties of this polyrotaxane (RX-2) are as follows.
Side chain modification degree: 0.5 (50%)
Side chain molecular weight: about 650 on average Weight average molecular weight Mw of polyrotaxane (GPC): 350,000
This is the polyrotaxane (A) having hydroxyl groups at the ends of the side chains.

<Production of RX-3>
RX-3 was obtained in the same manner as RX-1 except that linear polyethylene glycol (PEG) having a molecular weight of 20,000 was used as the polymer for forming an axial molecule and the amount of ε-caprolactone was changed to 20 g. The physical properties of this polyrotaxane (RX-3) are as follows.
Side chain modification degree: 0.5 (50%)
Side chain molecular weight: about 450 on average
Weight average molecular weight (Mw) of polyrotaxane (GPC): 300,000
This is the polyrotaxane (A) having hydroxyl groups at the ends of the side chains.

<Polyiso(Thio)Cyanate Compound (B)>
XDI: m-xylene diisocyanate

<Urethane Prepolymer (B2)>
A urethane prepolymer (B2) shown in Table 1 below was prepared.

TABLE 1

| (B2) Abbreviation | Component (B1) in use Component (C1) in use | iso(thio)cyanate equivalent | *(U)/(I) |
|---|---|---|---|
| Pre-1 | (B1) 2,4-tolylene diisocyanate (C1) polyoxytetramethylene glycol (number average molecular weight of 1,000) (C1) 1,4-butanediol | 319 | 1.0 |
| Pre-2 | (B1) 2,4-tolylene diisocyanate (C1) polyoxytetramethylene glycol (number average molecular weight of 1,000) (C1) diethylene glycol | 905 | 2.4 |
| Pre-3 | (B1) 2,4-tolylene diisocyanate (C1) polyoxytetramethylene glycol (number average molecular weight of 1,000) (C1) diethylene glycol | 539 | 1.1 |
| Pre-4 | (B1) 2,4-tolylene diisocyanate (C1) polyoxytetramethylene glycol (number average molecular weight of 1,000) (C1) diethylene glycol | 1500 | 3.9 |
| Pre-5 | (B1) 2,4-tolylene diisocyanate (C1) polyoxytetramethylene glycol (number average molecular weight of 1,000) (C1) diethylene glycol | 338 | 0.5 |
| Pre-6 | (B1) 2,4-tolylene diisocyanate (C1) polyoxytetramethylene glycol (number average molecular weight of 1,000) (C1) diethylene glycol | 4580 | 12.8 |

*(I): content of iso(thio)cyanate in prepolymer (molality (mol/kg))
(U): content of urethane bond (urea bond) in prepolymer (molality (mol/kg))

Production Examples of Urethane Prepolymer (B2)

PRODUCTION EXAMPLE

Production Example of Pre-1

50 g of 2,4-tolylene diisocyanate, 32 g of polyoxytetramethylene glycol (number average molecular weight; 1,000) and 10 g of 1,4-butanediol were reacted with one another in a nitrogen atmosphere in a flask equipped with a nitrogen introduction tube, thermometer and stirrer at 80° C. for 8 hours to obtain a terminal isocyanate urethane prepolymer having an iso(thio)cyanate equivalent of 319 (Pre-1).

Production Example Production Example of Pre-2

1,000 g of 2,4-tolylene diisocyanate and 1,800 g of polyoxytetramethylene glycol (number average molecular weight; 1,000) were reacted with each other in a nitrogen atmosphere in a flask equipped with a nitrogen introduction tube, thermometer and stirrer at 70° C. for 4 hours. Thereafter, 240 g of diethylene glycol was added to further carry out a reaction at 70° C. for 4 hours so as to obtain a terminal isocyanate urethane prepolymer having an iso(thio)cyanate equivalent of 905 (Pre-2).

Production Example Production Example of Pre-3

A terminal isocyanate urethane prepolymer having an iso(thio)cyanate equivalent of 539 (Pre-3) was obtained in the same manner as in the production example of Pre-2 except that 130 g of diethylene glycol was used.

Production Example Production Example of Pre-4

A terminal isocyanate urethane prepolymer having an iso(thio)cyanate equivalent of 1,500 (Pre-4) was obtained in the same manner as in the production example of Pre-2 except that 2,300 g of polyoxytetramethylene glycol (number average molecular weight; 1,000) was used.

Production Example Production Example of Pre-5

A terminal isocyanate urethane prepolymer having an isocyanate equivalent of 338 (Pre-5) was obtained in the same manner as in the production example of Pre-2 except that 1,500 g of polyoxytetramethylene glycol (number average molecular weight; 1,000) and 50 g of diethylene glycol were used.

Production Example Production Example of Pre-6

A terminal isocyanate urethane prepolymer having an isocyanate equivalent of 4,580 (Pre-6) was obtained in the same manner as in the production example of Pre-2 except that 2,500 g of polyoxytetramethylene glycol (number average molecular weight; 1,000) and 300 g of diethylene glycol were used.
<Active Hydrogen Group-Containing Compound Having an Active Hydrogen Group (C) Except for Polyrotaxane (A)>
PL1: DURANOL of Asahi Kasei Chemicals Corporation (polycarbonate diol, number average molecular weight of 500)
BudiOH; 1,4-butanediol
TMP: trimethylolpropane
TMP-30: trimethylolpropane tripolyoxyethylene ether of Nippon Nyukazai Co., Ltd.
PEMP: pentaerythritol tetrakis(3-mercaptopropionate)
MOCA: 4,4'-methylenebis(o-chloroaniline)
TMGdiAB: trimethylene glycol-di-p-aminobenzoate
PPG7: polypropylene glycol diol type average molecular weight of 700
<Other Components>
$CeO_2$: cerium oxide (cerium oxide powders having an average particle diameter of 0.2 μm)
L5617: silicone foam stabilizer manufactured by Momentive
SZ1142: silicone foam stabilizer manufactured by Dow Corning Toray Co., Ltd.
ET: TOYOCAT-ET (manufactured by Tosoh Corporation)
920-40: Microcapsule 920-40 (manufactured by Japan Fillite Co., Ltd.)

Example 1

RX-1 (100 parts by mass) as the component (A) was dissolved at 40° C. in a nitrogen atmosphere in a flask equipped with a nitrogen introduction tube, thermometer and stirrer and mixed with DXI (15 parts by mass) as the component (B) under agitation to obtain a homogeneous solution so as to prepare a polymerizable composition according to the following formulation. The amount of each component is shown in Table 2.
Formulation;
(A): 100 parts by mass of RX-1
(B): 15 parts by mass of XDI
The above polymerizable composition was injected into a flat casting mold. Thereafter, it was cured at 80° C. for 2 hours and then at 90° C. for 4 hours. After polymerization, the urethane resin was taken out from the casting mold. The obtained urethane resin had an abrasion resistance of 3.9 and a D hardness of 30. The abrasion resistance and hardness were evaluated as follows. The results are shown in Table 3.
[Evaluation Items]
(1) abrasion resistance: Abrasion was carried out with polishing paper (#600) under a load of 7 pounds at a revolution of 200 rpm for a polishing time of 5 minutes by using the ECOMET-3 one-side polishing machine of BUEHLER while water was let flow to evaluate abrasion resistance. The following evaluation method was adopted. (abrasion loss by polishing/weight of resin before polishing)×100(%)
(2) Shore-D hardness was measured with the durometer of Kobunshi Keiki Co., Ltd. in accordance with JIS (hardness test) K6253.

Example 2

RX-1 (100 parts by mass) as the component (A) and PL1 (100 parts by mass), TMP (30 parts by mass) and TMP-30 (100 parts by mass) as the components (C) were mixed together under agitation at 40° C. in a nitrogen atmosphere in a flask equipped with a nitrogen introduction tube, thermometer and stirrer to obtain a homogeneous solution, the temperature was returned to room temperature, and XDI (220 parts by mass) as the component (B) was added to the homogeneous solution and stirred uniformly to obtain a polymerizable composition. The amount of each component is shown in Table 2.
(A): 100 parts by mass of RX-1
(B): 220 parts by mass of XDI
(C): 100 parts by mass of PL1, 30 parts by mass of TMP, 100 parts by mass of TMP-30
The above polymerizable composition was injected into a flat casting mold. Thereafter, it was cured at 80° C. for 2 hours and then at 90° C. for 4 hours. After polymerization, the urethane resin was taken out from the casting mold. The obtained urethane resin had an abrasion resistance of 2.9% and a D hardness of 64. The results are shown in Table 3.

Examples 3 to 7, Comparative Examples 1 and 2

Cured bodies were manufactured and evaluated in the same manner as in Example 2 except that polymerizable compositions having composition shown in Table 2 were used. The results are shown in Table 3.

Example 8

A cured body was manufactured and evaluated in the same manner as in Example 1 except that a polymerizable composition having composition shown in Table 2 was used. The results are shown in Table 3.

Example 9

Pre-1 (463 parts by mass) as the component (B2) which is the component (B) and dried cerium oxide powders having an average particle diameter of 0.2 μm (30 parts by mass) were introduced into a flask equipped with a nitrogen introduction tube, thermometer and stirrer and fully stirred.

A homogeneous solution prepared separately by mixing together RX-1 (100 parts by mass) as the component (A) and PL1 (100 parts by mass) and BudiOH (42 parts by mass) as the components (C) under agitation at 60° C. was introduced into the flask. Thereafter, stirring under agitation was further carried out in the flask to obtain a polymerizable composition. The amount of each component is shown in Table 2.
(A): 100 parts by mass of RX-1
(B): 463 parts by mass of Pre-1
(C): 100 parts by mass of PL1, 42 parts by mass of BudiOH
(other component): 30 parts by mass of $CeO_2$ The above polymerizable composition was injected into a flat casting mold. Thereafter, it was cured at 80° C. for 2 hours and then at 90° C. for 4 hours. After polymerization, the urethane resin was taken out from the casting mold. The obtained urethane resin had an abrasion resistance of 2.2% and a D hardness of 65. The results are shown in Table 3.

TABLE 2

| No. | Component (A) (part by mass) | Component (B) (part by mass) | Component (C) (part by mass) | other component (part by mass) |
|---|---|---|---|---|
| Ex. 1 | RX-1 (100) | XDI (15) | — | — |
| Ex. 2 | RX-1 (100) | XDI (220) | PL1(100)/TMP(30)/TMP-30(100) | — |
| Ex. 3 | RX-1 (100) | XDI (83) | PL1(30)/TMP(10)/TMP-30(33) | — |
| Ex. 4 | RX-1 (100) | XDI (784) | PL1(480)/TMP(180)/TMP-30(230) | — |
| Ex. 5 | RX-3 (100) | XDI (385) | PL1(160)/TMP(50)/PEMP(20)/TMP-30(182) | — |
| Ex. 6 | RX-1 (100) | Pre-1 (463) | PL1(100)/BudiOH(42) | — |
| Ex. 7 | RX-2 (100) | Pre-1 (445) | PL1(100)/BudiOH(42) | — |
| Ex. 8 | RX-1 (100) | Pre-1 (50) | — | — |
| Ex. 9 | RX-1 (100) | Pre-1 (463) | PL1(100)/BudiOH(42) | $CeO_2$(30) |
| C. Ex. 1 | — | XDI (100) | PL1(76)/TMP(20)/TMP-30(33) | — |
| C. Ex. 2 | — | Pre-1 (100) | PL1(8.6)/BudiOH(12.9) | — |

| No. | total number of moles of groups having active hydrogen/number of moles of iso(thio)cyanate groups | number of moles of all groups having active hydrogen/number of moles of iso(thio)cyanate groups |
|---|---|---|
| Ex. 1 | 0.08/0.16 | 0.15/0.16 |
| Ex. 2 | 2.27/2.34 | 2.35/2.34 |
| Ex. 3 | 0.80/0.88 | 0.88/0.88 |
| Ex. 4 | 8.60/8.33 | 8.68/8.33 |
| Ex. 5 | 4.01/4.09 | 4.10/4.09 |
| Ex. 6 | 1.37/1.48 | 1.49/1.48 |
| Ex. 7 | 1.38/1.42 | 1.42/1.42 |
| Ex. 8 | 0.08/0.16 | 0.15/0.16 |
| Ex. 9 | 1.37/1.48 | 1.49/1.48 |
| C. Ex. 1 | 1.12/1.06 | 1.12/1.06 |
| C. Ex. 2 | 0.32/0.32 | 0.32/0.32 |

Ex.: Example
C. Ex.: Comparative Example

TABLE 3

| No. | Abrasion esistance (%) | D hardness |
|---|---|---|
| Example 1 | 3.9 | 30 |
| Example 2 | 2.9 | 64 |
| Example 3 | 2.2 | 60 |
| Example 4 | 4.8 | 64 |
| Example 5 | 4.4 | 69 |
| Example 6 | 1.9 | 58 |
| Example 7 | 1.1 | 63 |
| Example 8 | 2.5 | 40 |
| Example 9 | 2.2 | 65 |
| Comparative Example 1 | 10.0 | 63 |
| Comparative Example 2 | 6.0 | 70 |

Example 10

RX-1 (100 parts by mass) as the component (A) and MOCA (21 parts by mass) as the component (C) were mixed together at 120° C. to obtain a homogeneous solution which was then fully desired and cooled to 100° C. Pre-2 (296 parts by mass; urethane prepolymer (B2)) as the component (B) heated at 70° C. was added to this homogeneous solution and stirred with a planetary centrifugal mixer to obtain a homogeneous polymerizable composition. The amount of each component is shown in Table 4.
(A): 100 parts by mass of RX-1
(B): 296 parts by mass of Pre-2
(C): 21 parts by mass of MOCA
The above polymerizable composition was injected into a mold and cured at 100° C. After polymerization, a urethane resin having a thickness of 2 mm was obtained by taking it out from the mold. The obtained urethane resin had a polishing rate of 1.9 μm/hr, a scratch resistance of 1, a Taber abrasion loss of 19 mg, a D hardness of 30, a density of 1.1 g/cm$^3$ and a hysteresis loss of 10%. The results are shown in Table 5. Abrasion resistance and hardness were evaluated as follows.

[Evaluation Items]

(3) polishing rate: Polishing conditions are shown below.
Polishing pad: 380 φ
Object to be polished: three 2-inch sapphire wafers
Slurry: FUJIMI COMPOL 80 stock solution
Pressure: 411 g/cm$^2$
Revolution: 60 rpm
Time: 1 hour The polishing rate was measured when polishing was carried out under the above conditions.

(4) scratch: The existence or nonexistence of a scratch in wafers which were polished under the conditions described in
(3) was checked. Evaluation was carried out based on the following criteria.
1: No scratch is seen visually and through a laser microscope.
2: A scratched cannot be seen visually but can be seen through a laser microscope.
3: One or two scratches can be seen visually only at edges of wafers.
4: Three or more scratches can be seen visually only at the edges of wafers, or one or two scratches can be seen in whole wafers.
5: Three or more scratches can be seen visually in whole wafers.

(5) Taber abrasion loss: This was measured with the Model 5130 of Taber Co., Ltd. A Taber abrasion test was carried out with the H-18 abrasion wheel under a load of 1 kg at a revolution speed of 60 rpm and a revolution number of 1,000.

(6) density: The density was measured with the DSG-1 of Toyo Seiki Seisaku-sho Ltd.

(7) hysteresis loss: A resin punched into a dumbbell No. 8 form having a thickness of 2 mm was elongated 20 mm at a rate of 10 mm/min with the AG-SX autograph of Shimadzu Corporation, and then a hysteresis loss was measured when stress returned to "0".

Examples 11 to 14, Comparative Example 3

Cured bodies were manufactured and evaluated in the same manner as in Example 10 except that polymerizable compositions having composition shown in Table 4 were used. The results are shown in Table 5.

TABLE 4

| No. | Component (A) (part by mass) | Component (B) (part by mass) | Component (C) (part by mass) | other component (part by mass) |
|---|---|---|---|---|
| Ex. 10 | RX-1 (100) | Pre-2 (296) | MOCA (21) | — |
| Ex. 11 | RX-1 (100) | Pre-4 (490) | MOCA (21) | — |
| Ex. 12 | RX-1 (100) | Pre-2 (2955) | TMGdiAB (463) | — |
| Ex. 13 | RX-1 (100) | Pre-6 (9350) | MOCA (238) | — |
| Ex. 14 | RX-3 (100) | Pre-2 (129) | — | — |
| C. Ex. 3 | — | Pre-2 (100) | MOCA (14) | — |

TABLE 4-continued

| No. | total number of moles of groups having active hydrogen/number of moles of iso(thio)cyanate groups | number of moles of all groups having active hydrogen/number of moles of iso(thio)cyanate groups |
|---|---|---|
| Ex. 10 | 0.23/0.33 | 0.31/0.33 |
| Ex. 11 | 0.23/0.33 | 0.31/0.33 |
| Ex. 12 | 3.02/3.27 | 3.10/3.27 |
| Ex. 13 | 1.86/2.04 | 1.94/2.04 |
| Ex. 14 | 0.05/0.14 | 0.14/0.14 |
| C. Ex. 3 | 1.12/1.06 | 1.12/1.06 |

Ex.: Example
C. Ex.: Comparative Example

TABLE 5

| No. | Polishing rate (μm/hr) | scratch resistance | Taber abrasion loss (mg) | D hardness | Density (g/cm$^3$) | hysteresis loss (%) |
|---|---|---|---|---|---|---|
| Ex. 10 | 1.9 | 1 | 19 | 30 | 1.1 | 10 |
| Ex. 11 | 1.9 | 1 | 20 | 25 | 1.1 | 10 |
| Ex. 12 | 1.0 | 3 | 30 | 45 | 1.2 | 55 |
| Ex. 13 | 0.9 | 3 | 35 | 5 | 1.1 | 45 |
| Ex. 14 | 1.7 | 1 | 21 | 27 | 1.1 | 10 |
| C. Ex. 3 | 0.2 | 5 | 60 | 60 | 1.2 | 60 |

Ex.: Example
C.Ex.: Comparative Example

Example 15

L5617 (6.3 parts by mass) as the other component was added to Pre-2 (296 parts by mass; urethane prepolymer (B2)) as the component (B) heated at 70° C. and violently stirred at 2,000 rpm in a nitrogen atmosphere by using a stirrer having a stirring blade as a beater to take in air bubbles by a mechanical froth method. Separately, a homogeneous solution was prepared at 120° C. by mixing together RX-1 (100 parts by mass) as the component (A) and MOCA (21 parts by mass) as the component (C). The homogeneous solution was fully deaerated, cooled to 100° C., added to Pre-2 which took in air bubbles and violently stirred at 2,000 rpm in a nitrogen atmosphere by using a stirrer having a stirring blade as a beater to take in air bubbles by the mechanical froth method so as to obtain a homogeneous polymerizable composition having a foam structure. The amount of each component is shown in Table 6.
(A): 100 parts by mass of RX-1
(B): 296 parts by mass of Pre-2
(C): 21 parts by mass of MOCA
(other component): 6.3 parts by mass of L-5617

The above polymerizable composition was injected into a mold and cured at 100° C. After polymerization, the urethane resin was taken out from the mold to obtain a foamed urethane resin having a thickness of 2 mm. The obtained urethane resin had a polishing rate of 3.2 μm/hr, a scratch resistance of 1, a Taber abrasion loss of 15 mg, a D hardness of 20, a density of 0.7 g/cm$^3$ and a hysteresis loss of 10%. These evaluations were made in the same manner as in Example 10. The results are shown in Table 7.

Examples 16 to 20, Comparative Example 4

Cured bodies were manufactured and evaluated in the same manner as in Example 15 except that polymerizable compositions having composition shown in Table 6 were used. The results are shown in Table 7.

Example 21

SZ1142 (6.8 parts by mass), water (0.4 part by mass) and ET (0.2 part by mass) as the other components were added to Pre-2 (341 parts by mass; urethane prepolymer (B2)) as the component (B) heated at 70° C. and stirred at 2,000 rpm for 1 minute by using a planetary centrifugal mixer (manufactured by Thinky Corporation). Separately, a homogeneous solution was prepared at 120° C. by mixing together RX-1 (100 parts by mass) as the component (A) and MOCA (21 parts by mass) as the component (C). The homogeneous solution was fully deaerated, cooled to 100° C., added to Pre-2 which took in air bubbles and stirred at 2,000 rpm for 1 minute by using a planetary centrifugal mixer (manufactured by Thinky Corporation) to obtain a homogeneous polymerizable composition having a foam structure. The amount of each component is shown in Table 6.
(A): 100 parts by mass of RX-1
(B): 341 parts by mass of Pre-2
(C): 21 parts by mass of MOCA
(other components): 6.8 parts by mass of SZ1142, 0.4 part by mass of water, 0.2 part by mass of ET The above polymerizable composition was injected into a mold and cured at 100° C. After polymerization, the urethane resin was taken out from the mold to obtain a foamed urethane resin having a thickness of 2 mm. The obtained urethane resin had a polishing rate of 3.4 µm/hr, a scratch resistance of 1, a Taber abrasion loss of 14 mg, a D hardness of 23, a density of 0.9 g/cm$^3$ and a hysteresis loss of 8%. These evaluations were made in the same manner as in Example 10. The results are shown in Table 7.

Example 22

A cured body was manufactured and evaluated in the same manner as in Example 21 except that a polymerizable composition having composition shown in Table 6 was used. The results are shown in Table 7.

Example 23

920-40 (3.4 parts by mass) was added to Pre-2 (307 parts by mass; urethane prepolymer (B2)) as the component (B) heated at 70° C. and stirred at 2,000 rpm for 1.5 minutes by using a planetary centrifugal mixer (manufactured by Thinky Corporation). Separately, a homogeneous solution was prepared at 120° C. by mixing together RX-1 (100 parts by mass) as the component (A) and MOCA (21 parts by mass) as the component (C). The homogeneous solution was fully deaerated, cooled to 100° C., added to Pre-2 which took in air bubbles and stirred at 2,000 rpm for 1.5 minutes by using a planetary centrifugal mixer (manufactured by Thinky Corporation) to obtain a homogeneous polymerizable composition having a foam structure. The amount of each component is shown in Table 6.
(A): 100 parts by mass of RX-1
(B): 307 parts by mass of Pre-2
(C): 21 parts by mass of MOCA
(other component): 3.4 parts by mass of 920-40

The above polymerizable composition was injected into a mold and cured at 100° C. After polymerization, the urethane resin was taken out from the mold to obtain a foamed urethane resin having a thickness of 2 mm. The obtained urethane resin had a polishing rate of 3.3 µm/hr, a scratch resistance of 1, a Taber abrasion loss of 17 mg, a D hardness of 27, a density of 0.8 g/cm$^3$ and a hysteresis loss of 25%. These evaluations were made in the same manner as in Example 10. The results are shown in Table 7.

Example 24

A cured body was manufactured and evaluated in the same manner as in Example 22 except that a polymerizable composition having composition shown in Table 6 was used. The results are shown in Table 7.

TABLE 6

| No. | Component (A) (part by mass) | Component (B) (part by mass) | Component (C) (part by mass) | other component (part by mass) |
|---|---|---|---|---|
| Ex. 15 | RX-1 (100) | Pre-2 (296) | MOCA (21) | L5617 (6.3) |
| Ex. 16 | RX-1 (100) | Pre-3 (265) | MOCA (42) | L5617 (6.1) |
| Ex. 17 | RX-1 (100) | Pre-2 (821) | MOCA (94) | L5617 (15.2) |
| Ex. 18 | RX-1 (100) | Pre-2 (492) | MOCA (48) | L5617 (9.7) |
| Ex. 19 | RX-1 (100) | Pre-5 (111) | MOCA (21) | L5617 (3.5) |
| Ex. 20 | RX-1 (100) | Pre-5 (110) | PPG7 (54) | L5617 (3.9) |
| Ex. 21 | RX-1 (100) | Pre-2 (341) | MOCA (21) | SZ1142 (6.8)/ H$_2$O(0.4)/ ET (0.2) |
| Ex. 22 | RX-1 (100) | Pre-3 (191) | MOCA (21) | SZ1142 (3.8)/ H$_2$O(0.2)/ ET (0.1) |
| Ex. 23 | RX-1 (100) | Pre-2 (307) | MOCA (21) | 920-40(3.4) |
| Ex. 24 | RX-1 (100) | Pre-2 (511) | TMGdiAB (57) | 920-40(5.4) |
| C. Ex. 4 | — | Pre-2 (100) | MOCA (14) | L5617 (1.7) |

| No. | total number of moles of groups having active hydrogen/ number of moles of iso(thio)cyanate groups | number of moles of all groups having active hydrogen/number of moles of iso(thio)cyanate groups |
|---|---|---|
| Ex. 15 | 0.23/0.33 | 0.31/0.33 |
| Ex. 16 | 0.39/0.49 | 0.47/0.49 |
| Ex. 17 | 0.78/0.91 | 0.86/0.91 |
| Ex. 18 | 0.44/0.54 | 0.52/0.54 |
| Ex. 19 | 0.23/0.33 | 0.31/0.33 |
| Ex. 20 | 0.23/0.33 | 0.31/0.33 |
| Ex. 21 | 0.28/0.38 | 0.36/0.38 |
| Ex. 22 | 0.36/0.35 | 0.34/0.35 |
| Ex. 23 | 0.23/0.33 | 0.31/0.33 |
| Ex. 24 | 0.44/0.54 | 0.52/0.54 |
| C. Ex. 4 | 0.10/0.11 | 0.10/0.11 |

Ex.: Example
C. Ex.: Comparative Example

TABLE 7

| No. | Polishing rate (µm/hr) | scratch resistance | Taper abrasion loss (mg) | D hardness | Density (g/cm$^3$) | hysteresis loss (%) |
|---|---|---|---|---|---|---|
| Ex. 15 | 3.2 | 1 | 15 | 20 | 0.7 | 10 |
| Ex. 16 | 2.4 | 2 | 19 | 35 | 0.7 | 44 |
| Ex. 17 | 3.2 | 1 | 18 | 30 | 0.7 | 36 |
| Ex. 18 | 3.2 | 1 | 16 | 25 | 0.7 | 20 |
| Ex. 19 | 1.5 | 3 | 29 | 60 | 0.7 | 58 |
| Ex. 20 | 0.9 | 3 | 27 | 12 | 0.7 | 20 |
| Ex. 21 | 3.4 | 1 | 14 | 23 | 0.9 | 8 |

TABLE 7-continued

| No. | Polishing rate (μm/hr) | scratch resistance | Taper abrasion loss (mg) | D hardness | Density (g/cm$^3$) | hysteresis loss (%) |
|---|---|---|---|---|---|---|
| Ex. 22 | 2.7 | 2 | 21 | 32 | 0.9 | 39 |
| Ex. 23 | 3.0 | 2 | 17 | 27 | 0.8 | 25 |
| Ex. 24 | 2.9 | 2 | 22 | 30 | 0.8 | 40 |
| C. Ex. 4 | 0.7 | 5 | 50 | 40 | 0.8 | 60 |

Ex.: Example
C.Ex.: Comparative Example

As obvious from the above examples and comparative examples, urethane resins for polishing obtained by using a polyrotaxane as the component (A) have excellent durability.

EXPLANATION OF REFERENCE NUMERALS

1: polyrotaxane
2: axial molecule
3: cyclic molecule
4: bulky terminal group
5: side chain

The invention claimed is:

1. A urethane resin obtained by polymerizing a polymerizable composition, which comprises (A) a polyrotaxane having a composite molecular structure comprising an axial molecule and a plurality of cyclic molecules clathrating the axial molecule, wherein side chains having a group with active hydrogen which are introduced into at least some of the cyclic molecules, and (B) a polyiso(thio)cyanate compound,
    wherein the polyiso(thio)cyanate compound (B) contains (B2) a urethane prepolymer having an iso(thio)cyanate group at the end of the molecule which is obtained by reacting (C1) a bifunctional active hydrogen-containing compound having two groups with active hydrogen in the molecule with (B1) a bifunctional iso(thio)cyanate group-containing compound having two iso(thio)cyanate groups in the molecule.

2. The urethane resin according to claim 1, wherein the polymerizable composition comprises 3 to 2,000 parts by mass of the polyiso(thio)cyanate compound (B) based on 100 parts by mass of the polyrotaxane (A).

3. The urethane resin according to claim 1, wherein the polymerizable composition further comprises (C) an active hydrogen-containing compound having a group with active hydrogen except for the polyrotaxane (A).

4. The urethane resin according to claim 3, wherein the active hydrogen-containing compound (C) contains an amino group compound (CA) having an amino group as the group having active hydrogen.

5. The urethane resin according to claim 3, wherein the polymerizable composition comprises 10 to 3,000 parts by mass of the polyiso(thio)cyanate compound (B) and 3 to 2,000 parts by mass of the active hydrogen-containing compound (C) based on 100 parts by mass of the polyrotaxane (A).

6. The urethane resin according to claim 1, wherein the isocyanate equivalent of the polyiso(thio)cyanate compound (B) containing the urethane prepolymer (B2) is 300 to 5,000.

7. A polishing pad made of the urethane resin of claim 1.

8. The urethane resin according to claim 4, wherein the polymerizable composition comprises 10 to 3,000 parts by mass of the polyiso(thio)cyanate compound (B) and 3 to 2,000 parts by mass of the active hydrogen-containing compound (C) based on 100 parts by mass of the polyrotaxane (A).

9. A polishing pad made of the urethane resin of claim 2.

10. A polishing pad made of the urethane resin of claim 3.

11. A polishing pad made of the urethane resin of claim 4.

12. A polishing pad made of the urethane resin of claim 5.

13. A polishing pad made of the urethane resin of claim 6.

* * * * *